(12) United States Patent  (10) Patent No.: US 9,220,206 B2
Walliser  (45) Date of Patent: Dec. 29, 2015

(54) HYDROPONIC METHOD AND SYSTEM

(71) Applicant: Deborah Walliser, Santa Cruz, CA (US)

(72) Inventor: Deborah Walliser, Santa Cruz, CA (US)

(73) Assignee: Got Produce? Franchising, Inc., San Francisco, CA (US)

( * ) Notice: Subject to any disclaimer, the term of this patent is extended or adjusted under 35 U.S.C. 154(b) by 124 days.

(21) Appl. No.: 13/662,134

(22) Filed: Oct. 26, 2012

(65) Prior Publication Data

US 2013/0283689 A1    Oct. 31, 2013

Related U.S. Application Data

(60) Provisional application No. 61/551,431, filed on Oct. 26, 2011.

(51) Int. Cl.
*A01G 31/00* (2006.01)
*A01G 31/02* (2006.01)

(52) U.S. Cl.
CPC ..................... *A01G 31/02* (2013.01)

(58) Field of Classification Search
CPC .......... E04B 7/102; A61G 9/14; A01G 31/00; A01G 31/02; A01G 9/14
USPC ............ 119/226, 228, 233; 135/124; 52/81.1, 52/80.1
See application file for complete search history.

(56) References Cited

U.S. PATENT DOCUMENTS

| | | | | |
|---|---|---|---|---|
| 3,998,186 | A | * | 12/1976 | Hodges ........................ 119/207 |
| 4,077,158 | A | * | 3/1978 | England ........................ 47/59 R |
| 4,149,970 | A | * | 4/1979 | Atkins et al. ................... 47/62 N |
| 4,169,050 | A | * | 9/1979 | Serfling et al. ................. 210/602 |
| 4,170,844 | A | | 10/1979 | Steele |
| 5,054,233 | A | | 10/1991 | Evans |
| 5,121,708 | A | | 6/1992 | Nuttle |
| 5,224,294 | A | | 7/1993 | Reed |
| 5,755,852 | A | | 5/1998 | Northrop |
| 6,000,173 | A | | 12/1999 | Schow |
| 6,451,206 | B1 | * | 9/2002 | Charbonneau ........... 210/170.09 |
| 6,843,910 | B1 | | 1/2005 | Thomas |
| 7,069,691 | B2 | | 7/2006 | Brooke |

(Continued)

FOREIGN PATENT DOCUMENTS

GB    2234147 A * 1/1991 ............. A01G 31/00

OTHER PUBLICATIONS

Argus Control Systems Ltd., "The Argus System", http://www.arguscontrols.com/system/, retrieved Nov. 5, 2015, 2 pages.

(Continued)

*Primary Examiner* — Rob Swiatek
*Assistant Examiner* — Ebony Evans
(74) *Attorney, Agent, or Firm* — Stoel Rives LLP

(57) ABSTRACT

A hydroponic pond is provided that has a depth in the approximate range from 24 inches to 36 inches. This depth of pond water provides a volume of water that increases thermal stability of the hydroponic pond. A nutritional formulation is developed in view of an analysis of a source water make-up for combination with the source water to achieve a desired chemical and nutritional mix. The nutritional formulation and the source water are then combined and placed within a hydroponic pond. A computational system is provided that monitors the state of a hydroponic environment and directs input modules as programmed and in order to sponsor plant growth, plant quality, and volume of plant yield.

7 Claims, 19 Drawing Sheets

(56) References Cited

U.S. PATENT DOCUMENTS

| | | | |
|---|---|---|---|
| 7,335,291 B2 | 2/2008 | Kondo | |
| 7,818,916 B2 | 10/2010 | Bissonnette | |
| 7,861,459 B2 | 1/2011 | Brooke | |
| 8,002,245 B2 * | 8/2011 | Sylvester | 261/26 |
| 2007/0151522 A1 * | 7/2007 | Brauman | 119/228 |
| 2013/0081327 A1 * | 4/2013 | Buck et al. | 47/62 A |
| 2013/0152469 A1 * | 6/2013 | Kao | 47/62 R |

OTHER PUBLICATIONS

H. E. Anderson Company, "Anderson aqua—Injection System and Irrigation Controller", http://heanderson.com/AndersonAqua%20Brochure_Web.pdf, retrieved Nov. 5, 2015, 2 pages.

Hydronov, "High Density Hydroponic Growing Systems", http://www.hydronov.com/2014/automation.html, retrieved Nov. 5, 2015, 4 pages.

* cited by examiner

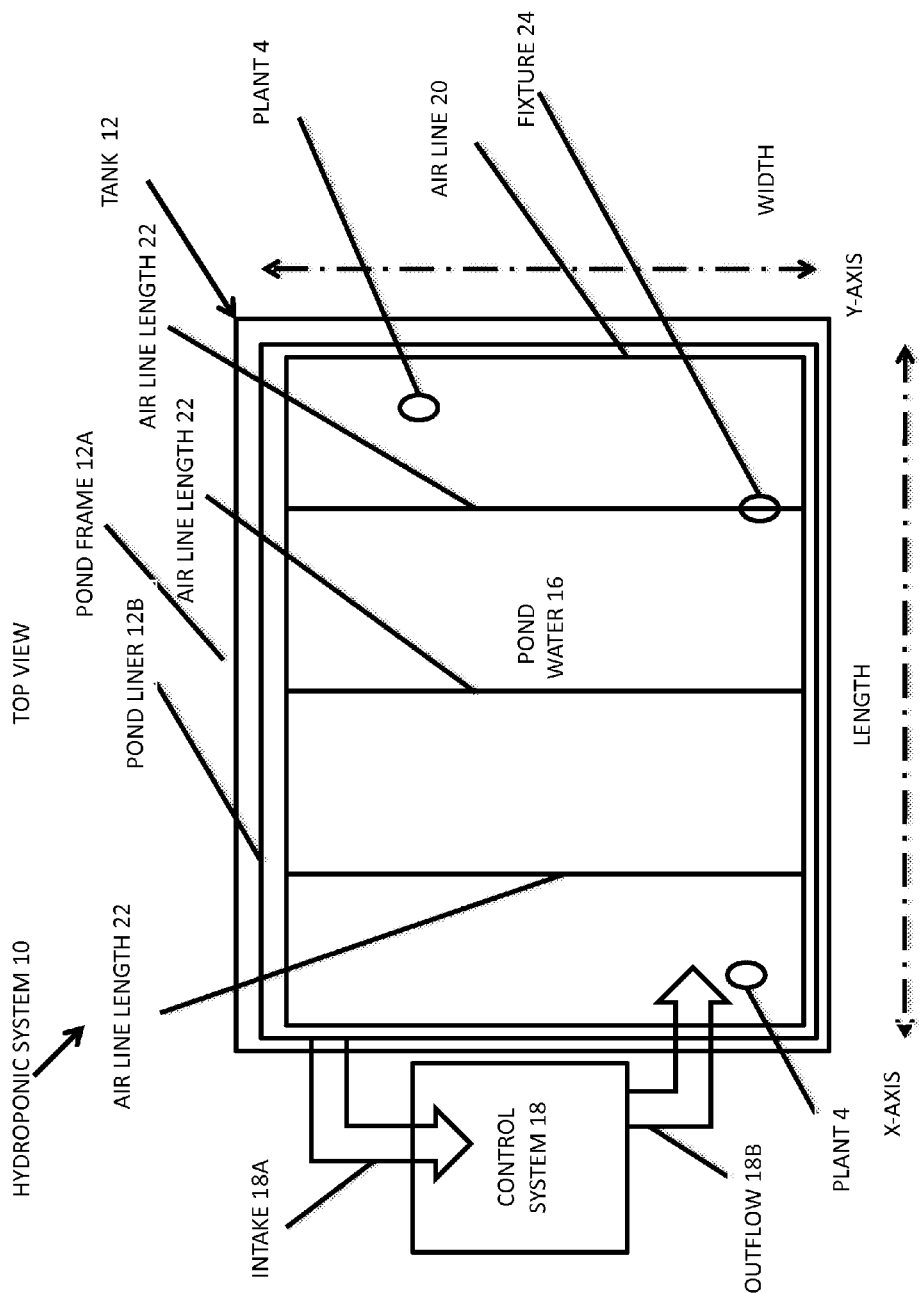

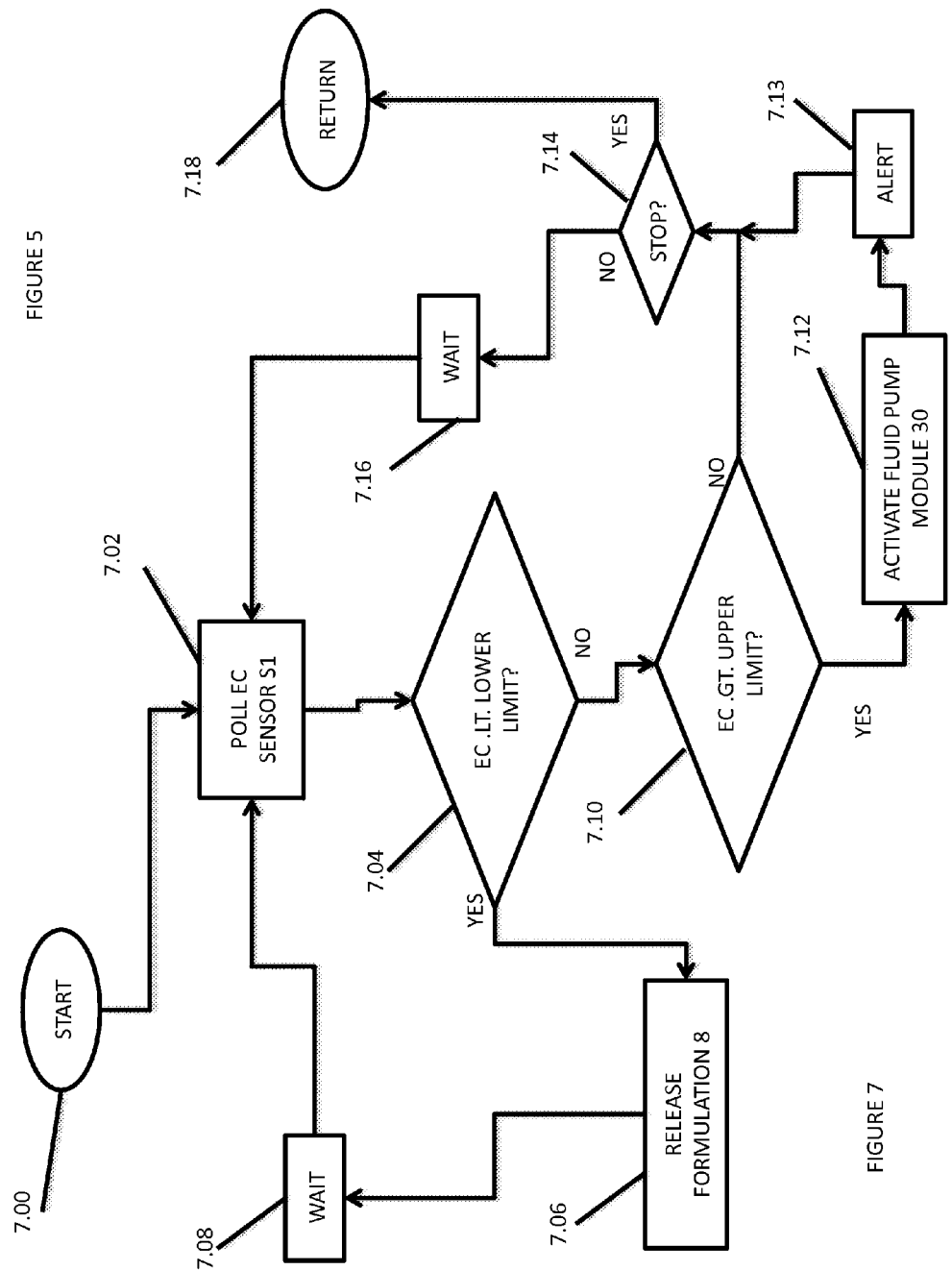

HYDROPONIC METHOD AND SYSTEM

RELATED APPLICATION

This application claims the benefit of the filing date of U.S. Provisional Patent Application No. 61/551,431, filed Oct. 26, 2011 and titled HYDROPONIC METHOD AND SYSTEM and which is incorporated herein by reference in its entirety.

TECHNICAL FIELD

The present disclosure relates to hydroponic agriculture. More particularly, the present disclosure relates to methods and systems for use in nurturing and harvesting plants in hydroponic environments.

BACKGROUND INFORMATION

Hydroponic technology is being increasingly deployed for growing food and medicinal crops. Improvements in crop yield per unit of resource expended in hydroponic settings can generate significant benefits to many agricultural operations and thereby address society's increasing needs for resource-efficient agriculture.

The prior art teaches that shallow pools, i.e., ponds having depths in a range from 0.125 inch to 0.25 inch, are preferred in order to maximize yield per resource input. In addition, the prior art teaches toward filtering source water prior to use in a hydroponic pond, although filtering source water can be resource intensive.

The prior art fails to optimally manage and apply to hydroponic agriculture essential crop inputs, such as water, oxygen, nutrients, heat, and electricity, to maximize volume and quality of crop production.

SUMMARY OF THE DISCLOSURE

Disclosed are techniques enabling improvements in hydroponic agriculture.

In a first aspect of the method of the present disclosure, a source water is examined to determine its chemical and biochemical make-up. This source water make-up is then compared with the desired chemical and nutritional mix that are provided to plants in a hydroponic setting. A nutritional formulation is then developed in view of the source water make-up to combine with the source water and to result in the desired chemical and nutritional mix. The nutritional formulation and the source water are then combined and placed within a hydroponic pond.

According to a second aspect of the method of the present disclosure, a computational system is provided that monitors the state of a hydroponic environment and directs input modules as programmed and in order to sponsor plant growth, plant quality, and volume of plant yield. The computational system (hereinafter, "control system") may optionally include sensors that monitor one or more environmental parameters, to include pond water temperature, electrical conductivity of the pond water, pond water salinity, oxygen concentration of the pond water, pH of the pond water, ambient air temperature, ambient air humidity, and/or sunlight energy intensity. In certain embodiments of the method of the present disclosure, salinity is indirectly measured by measuring the electrical conductivity of the pond water.

The control system may optionally include one or more input modules that dispense or mitigate oxygen concentration of the pond water, nutritional additives, sulphuric acid, phosphoric acid, and/or other suitable acidic material known in the art. The system may optionally include an input material having a base pH input material, such as potassium hydroxide and/or other suitable acidic material known in the art.

Additionally or alternatively, the control system may include a shading system that controllably shields the pond water and ambient air volume from sunlight. Still additionally or alternately, the control system may include motorized fans that enable control or mitigation of air flow into the pond environment and/or air flow away from the pond environment.

According to a third optional aspect of the method, a hydroponic pond is provided that has a depth in an approximate range from 18 inches to 36 inches. This depth of pond water provides a volume of water that increases thermal stability of the hydroponic pond.

According to a fourth optional aspect of the method, a substantially hemispheric dome is provided that substantially shields and covers one or more hydroponic ponds and may further enclose an additional growth area for additional plants, such as vines.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 7,861,459 titled "Hydroponic plant nutrient circulation/distribution system"; U.S. Pat. No. 7,818,916 titled "pH buffered plant nutrient compositions and methods for growing plants"; U.S. Pat. No. 7,335,291 titled "Water treating method, water treating apparatus, and hydroponics system using the apparatus"; U.S. Pat. No. 7,069,691 titled "Hydroponics plant cultivation assembly for diverse sizes of pots and plants"; U.S. Pat. No. 6,843,910 titled "Ornamental pond"; U.S. Pat. No. 6,000,173 titled "Hydroponic growing station with intermittent nutrient supply"; U.S. Pat. No. 5,755,852 titled "Bioconverted nutrient rich humus"; U.S. Pat. No. 5,224,294 titled "Hydroponic growth system"; U.S. Pat. No. 5,121,708 titled "Hydroculture crop production system"; U.S. Pat. No. 5,054,233 titled "Hydroponic apparatus"; and U.S. Pat. No. 4,170,844 titled "Hydroponic gardening method and system".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application. Nothing herein is to be construed as an admission that the present disclosure is not entitled to antedate such publication by virtue of prior invention.

BRIEF DESCRIPTION OF THE DRAWING FIGURES

These, and further features of the disclosure, may be better understood with reference to the accompanying specification and drawings depicting embodiments, in which:

FIG. 2A is a top view of a hydroponic pond system, according to one embodiment;

FIG. 7 is a fourth control loop applied by the control system of FIG. 4A to maintain a salinity of the pond water below a preselected salinity value;

DESCRIPTION OF EMBODIMENTS

It is to be understood that this disclosure is not limited to particular aspects of described embodiments, as embodiments may, of course, vary. It is also to be understood that the terminology used herein is for the purpose of describing particular aspects only, and is not intended to be limiting, since the scope of the present disclosure will be limited only by the appended claims.

Methods recited herein may be carried out in any order of the recited events which is logically possible, as well as the recited order of events.

Where a range of values is provided herein, the range is inclusive of upper and lower values and any intermediate values therebetween.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
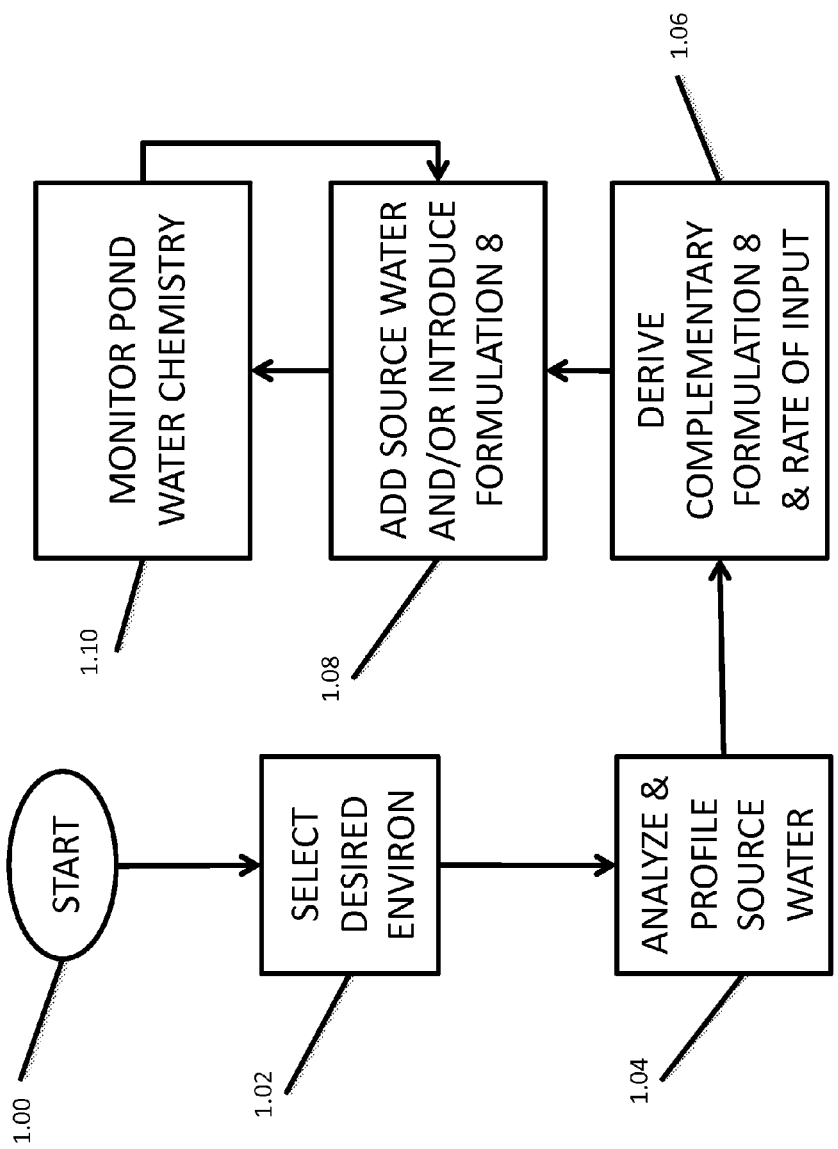
FIG. 1 is a process chart of the first aspect of the method of the present disclosure, wherein a nutritional formulation is developed in view of a source water make-up to combine with the source water to result in a desired chemical and nutritional mix.

Referring now to FIG. 1, a source water 2 is examined to determine its chemical and biochemical make-up. In step 1.02 a desirable mixture of concentrations of nutrients and other inputs relative to a source water volume is determined or selected. The chemical make-up of the source water 2 is then analyzed in step 1.04 and its constituents and their concentrations within the a sample volume of the source water 2 is documented in step 1.04.

This analysis of the source water 2 is then compared in step 1.06 with the desired chemical and nutritional mix that are provided to plants 4 in a hydroponic pond 6, and the complementary formulation 8 of chemical and optionally biochemical constituents is derived and developed in view of the results of the source water analysis of step 1.04. Optionally or additionally, a desired rate of input into the hydroponic pond 6 of one or more components of the complementary formulation 8 may also be determined in step 1.06.

The complementary formulation 8 is mixed and combined with the source water 2 in step 1.08 with the intent to provide a chemical and biochemical mixture that would be conducive to the growth of plants 4 selected to be nurtured in the hydroponic pond 6, optionally or additionally in accordance with a desired rate of input of the complementary formulation 8, or individual components thereof, in light of the volume of water 2 contained within the hydroponic pond 6. The complementary formulation 8 and the source water 2 are then combined and placed within the hydroponic pond 6 in relative volumes and amounts to result in the desired and intended concentrations of nutrients and other inputs in solution with the source water 2. The chemistry and physical parameters of the hydroponic pond 6, e.g., temperature, pH, and salinity, of the hydroponic pond 6 are monitored in repeated executions of step 1.10, and the individual components of the complementary formulation 8 are input into the hydroponic pond 6 in iterative executions of step 1.08 in order to maintain a stable or desirably dynamic physical state of the hydroponic pond 6. It is understood that additional inputs may be introduced into the source water 2 that are not included in the original complementary formulation 8 in one or more successive executions of step 1.08.

FIG. 2A is a top view of a hydroponic pond system 10. The pond system 10 includes (a.) a pond tank 12 (hereinafter, "tank" 12) having an external frame 12A and an internal liner 12B, wherein the liner 12B is impermeable to water; (b.) a volume of pond water 16 that comprises a volume of source water 2, the complementary formulation 8 and a plurality of plants 4; and (c.) a control system 18. The tank 12 has an internal length of the liner 12B in the range of 78 to 100 feet along an X axis, and an internal width of the liner in the range of 24 to 48 feet along a Y axis, wherein the Y axis is orthogonal to the X axis, and the X axis and the Y axis define a plane that is substantially parallel to the Earth's surface.

The tank may be or comprise a FOLDING FRAME TANK™ structure as marketed by Portable Tank Group of Sebastian, Fla., or other suitable fluid containing structure known in the art. The frame 12A may be or comprise aluminum and/or other suitable rigid material known in the art, and the liner 12B may be or comprise heavy duty vinyl standard 22, heavy duty vinyl standard 28, and/or other suitable water containment material known in the art.

The tank additionally, optionally or alternatively includes one or more of the following elements: A control system water intake pipe and valve 18A (hereinafter, "control intake pipe" 18A) comprising 2.0 inch Polyvinyl Chloride (hereinafter, "PVC") schedule 40 fluid pipe that accepts samples of pond water 16 from within the tank 12 at sampling port 18A.1 and delivers the samples of pond water 16 to the control system 18, wherein the sampling port 18A.1 is positioned to be submerged within the pond water 16 when the hydroponic system 10 is growing plants 4; A control system water outflow pipe 18B (hereinafter, "control outflow pipe" 18B) comprising size 2.0 inch PVC schedule 40 fluid pipe and having a nutrient port 18B.1 from which inputs, including nutrients, are delivered from the control system 18 and into the pond water 16, wherein the nutrient port 18B.1 is located distally from the sampling port 18A.1 at a distance greater than one half of the width or length of the tank 12, and wherein the nutrient port 18B.1 is positioned to be submerged within the pond water 16 when the hydroponic system 10 is growing plants 4; A main air line 20 of ¾" outer diameter air pipe that delivers releases compressed air into air line lengths 22 and runs along a perimeter of the pond liner 12A and within the tank 12, wherein the air line lengths 22 are positioned to be submerged within the pond water 16 when the hydroponic system 10 is growing plants 4; A plurality of additional air line lengths 22 comprising tubing having a ¾" outer diameter and located at intervals of 8 feet or closer within the liner 12B, wherein the air line lengths 22 are coupled to, and receive compressed air from, the main air line 20, and the air line lengths 22 are positioned to be submerged within the pond water 16 when the hydroponic system 10 is growing plants 4; A plurality of air releasing and pressure compensating emitters 24 inserted in the range of every 36" into the air line lengths 22, or with 18" spacing plus or minus 2 inches, wherein each air releasing emitter 24 may be or comprise a WOODPECKER JR™ part number DNJR12 one half gallon per hour pressure compensation air emitter as marketed by DripWorks, Inc. of Willits, Calif. or other suitable gas emitter device that is adapted to prevent pond water 16 backflow into the air line lengths 22 and therefrom into the main air line 20 when there is insufficient air pressure within the air line 20.

Figure 2B:
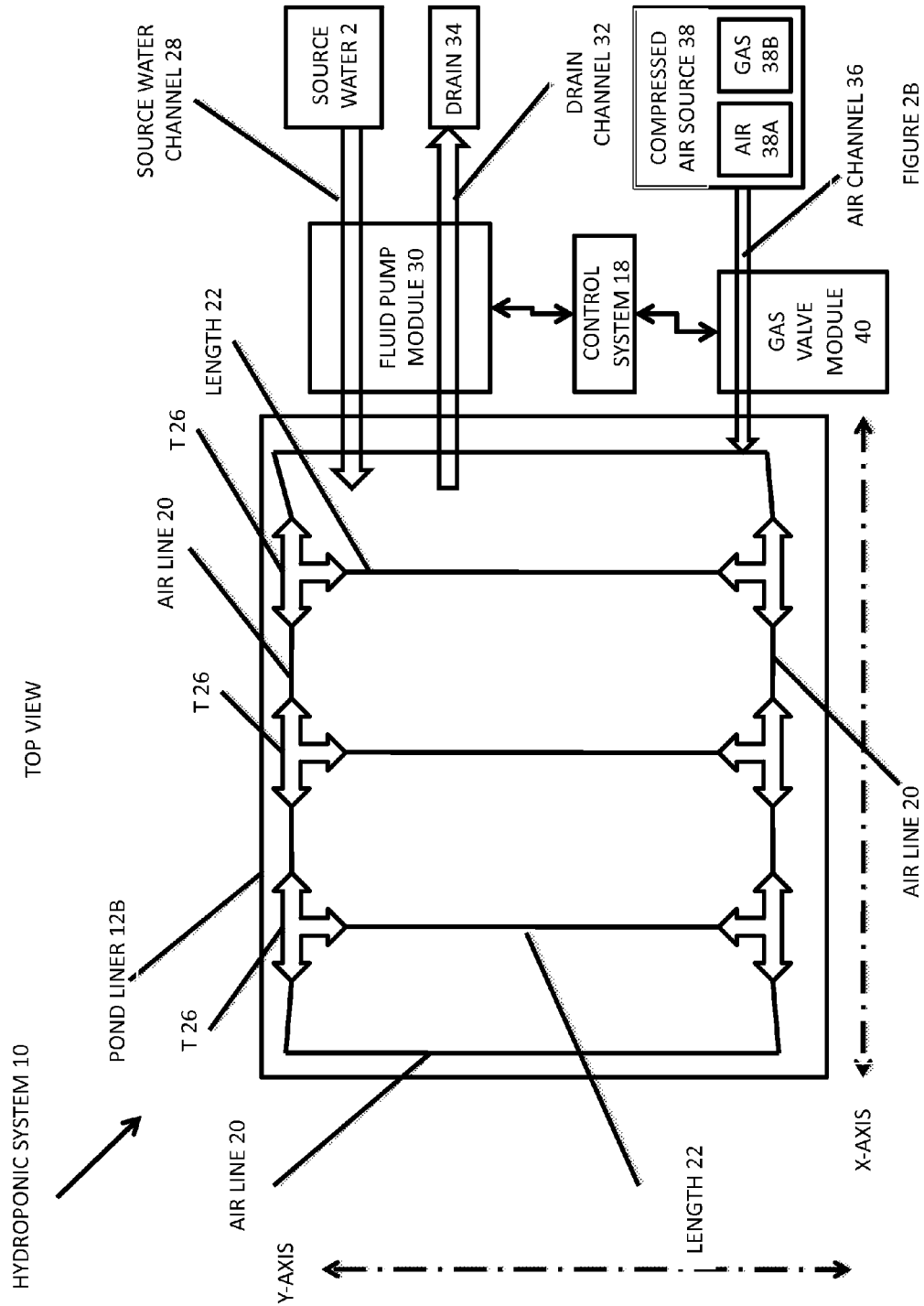
FIG. 2B is a schematic diagram of aspects of the hydroponic system of FIG. 2A.

FIG. 2B is a detailed schematic of the hydroponic pond system 10 and presents the following optional features: T fixtures 26 that hermetically join each air line length 22 to the main air line 20 and enable gas and air to flow freely between the air line 20 and the air line lengths 22; A source water channel 28 that provides a pathway for source water 2 into the tank 12 as enabled by a fluid pump module 30; A drain channel 32 that provides an exit pathway of pond water 16 from the tank 12 as enabled by the fluid pump module and into a drain 34; The fluid pump module 30 bi-directionally that is controlled by and communicatively coupled with the control system 18, wherein the fluid pump module 30 as directed by the control system 18, alternately (a.) simultaneously prevents or inhibits both source water 2 from entering the tank 12 via the source water channel 28 and pond water 16 from exiting the tank 12; (b.) pumps source water 2 into the tank 16; and pumps pond water 16 from the tank 12 and into the drain 32; and An air channel 36 adapted to provide from a compressed air source 38 pressurized air 38A and/or a gas 38B containing oxygen to the air line 20 as alternately enabled and disabled by a gas valve module, wherein the gas valve module is controlled and directed by, and bi-directionally communicatively coupled, with the control system 18, wherein the compressed air source 38 may be or comprise an EASY PRO™ diaphragm compressor air pump as marketed by Gast Manufacturing, Inc. of Benton Harbor, Mich., or other suitable source of compressed gas containing oxygen known in the art.

Figure 3:
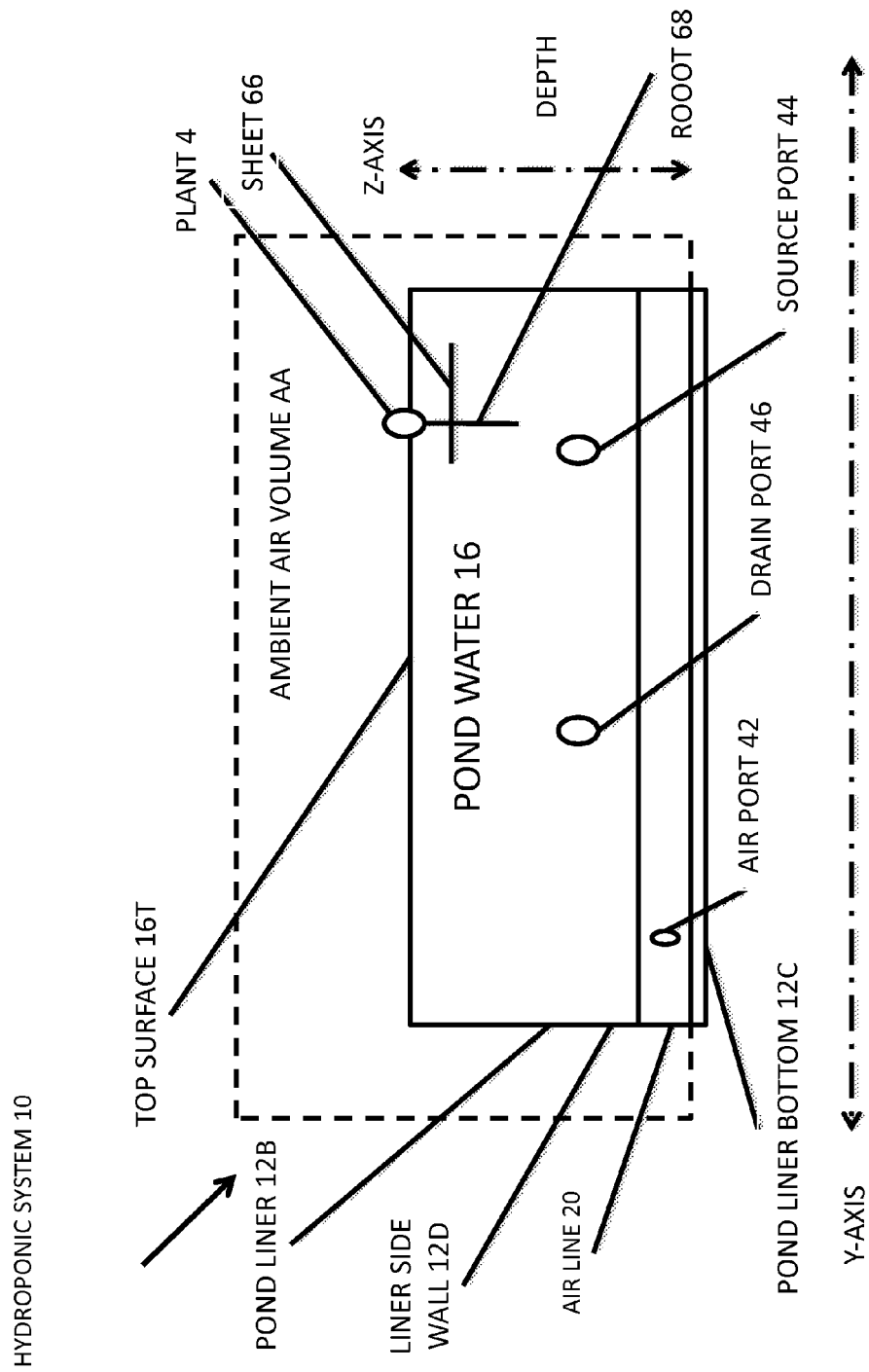
FIG. 3 is a cut-away side view of the hydroponic pond system of FIGS. 2A and 2B.

FIG. 3 is a cut away side view of the hydroponic system 10. Each air line length 22 is positioned to be submerged by the pond water 16 within the tank 12 and is adapted to release oxygen from below a top surface 16T of the pond water 16; and is optionally adapted to release oxygen within a distance of one inch or less from an internal bottom surface 12C of the liner 14. A plurality of liner side walls 12D extend along the Z axis and alternately along the A axis and Y axis to form side walls of the tank 12 and the hydroponic system 10. The pond water top surface 16T is in direct contact with an ambient air volume AA.

The depth dimension of the pond water 16 extends along a Z axis and from the pond water top surface 16T of the pond water 16 to the internal bottom surface 12C of the liner 14. The Z axis is orthogonal to the X-Y plane as disclosed in FIG. 2A. It is further understood that the internal liner bottom surface 12C is in contact with the pond water 16 whereby the liner 12B functions as an impermeable barrier and supports retaining the pond water 16 within the tank 12. The depth dimension of the pond water 16 is in the range of from approximately 18 inches to approximately 36 inches. Presenting a depth dimension between approximately 18 inches+/−two inches to approximately 36 inches+/−two inches teaches against the prior art, wherein depths of less than two inches are taught to be preferable as reducing the amount of inputs required, and depths of greater than 36 inches are taught to maximize the resulting growth of plants 4. The disclosed embodiments having the range of 18 inches+/−two inches to approximately 36 inches+/−two inches both encourages superior growth and plant yields while lowering energy consumption, operational costs, inputs of formulation 8 and components thereof, and other inputs.

An air port 42 of the air line 20 enables the air channel to hermetically couple with the air channel 36 and thereby accept air 38A or oxygenated gas 38B from the compressed air source 38 as enabled by the gas valve module 40. A source port 44 enables a hermetic seal with the source water channel 28 and permits source water 2 to enter the tank 12 as alternately enabled and disabled by the fluid pump module 30. A drain port 46 enables a hermetic seal with the drain channel 32 and permits pond water 16 to exit the tank 12 as alternately enabled and disabled by the fluid pump module 30.

Figure 4A:
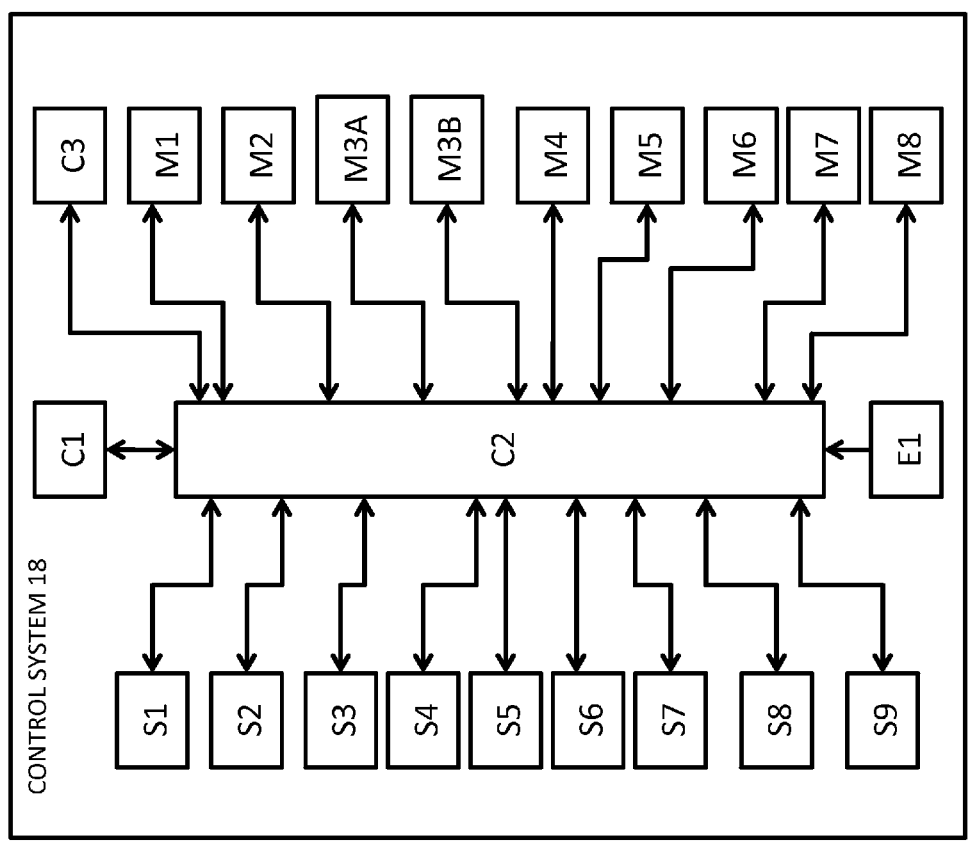
FIG. 4A is a schematic of a control system that is applicable to manage parameters of the hydroponic system of FIGS. 2A and 2B.

FIG. 4A is a schematic of the control system 18 that is applicable to the hydroponic system 10 of FIGS. 2A, 2B and 3. The control system 18 includes a processor C1 (hereinafter, "processor" C1") that may be or comprise (a.) an internet-enabled mobile communications device; (b.) a VAIO FS8900™ notebook computer marketed by Sony Corporation of America, of New York City, N.Y., (c.) a SUN SPARC-SERVER computer workstation marketed by Sun Microsystems of Santa Clara, Calif. running LINUX or UNIX operating system; (d.) a personal computer configured for running WINDOWS XP™ operating system marketed by Microsoft Corporation of Redmond, Wash.; (e.) a PowerBook G4™ personal computer as marketed by Apple Computer of Cupertino, Calif.; (f.) an Alienware M17x™ personal computer as marketed by the Dell Corporation; (g.) a Macbook Pro™ personal computer as marketed by Apple Computer of Cupertino, Calif.; or (h.) an internet enabled desktop computer; (h.) an iPad™ touch screen tablet personal computer as marketed by Apple Computer of Cupertino, Calif.; or (j) other suitable computational device adapted to receive and render digitized video data known in the art.

A plurality of sensors S1 through S9 are communicatively coupled with the control system 18. The plurality of sensors may be or comprise a water electrical conductivity sensor S1; a water pH sensor S2; a water temperature sensor S3; a sensor S4 of dissolved oxygen concentration of the pond water 16; an ambient air temperature sensor S5, an ambient air humidity sensor S6, an ambient air carbon dioxide sensor S7, an external air humidity sensor S8 and an external air temperature sensor S9.

The control system 18 may optionally include a plurality of input modules M1 through M8 including an oxygen module M1 that controllably delivers oxygen to the main air line 20 and air line lengths 22, a nutritional additive dispenser module M2, an acidic agent dispenser M3A and/or a base material dispenser M3B. The acidic agent dispenser M3A may controllably dispense sulphuric acid, phosphoric acid, and/or other suitable acidic agent into the pond water 16 to reduce the pH of the pond water 16. The base material dispenser M3B may controllably dispense potassium hydroxide and/or other suitable base material into the pond water 16 to raise the pH of the pond water 16.

It is understood that the pH sensor S2 and the acid and base modules M3A & M3B may be separate devices, or may be an integrated device, such as a BL 7916™ pH controller and chemical dosing pump as marketed by Hanna Instruments, Inc., of Woonsocket, R.I., or other suitable pH sensing, controlling and chemical dosing pumps known in the art, including integrated and functionally separated distributed pH sensors S2, and controlling and chemical dosing modules M3A & M3B. For example, the pH sensor S2 may be or comprise an HI 1286™ electrode pH indicator as marketed by Hanna Instruments, Inc., of Woonsocket, R.I., or other suitable pH sensor known in the art.

Optionally, the controller system may include an HI 2500™ mini-controller fertigation system as marketed by Hanna Instruments, Inc., of Woonsocket, R.I., to provide the functions of sensing and controlling the pH, salinity and electrical conduction properties of the pond water 16.

Additionally or alternatively, the control system 18 may include a shading system M4 that controllably shields the pond water 16 and the ambient air volume AA from sunlight. Still additionally or alternately the control system 18 may include one or more motorized fans M5 that enable control or mitigation (a.) of air flow into the pond environment; and/or (b.) air flow away from the pond environment. Still additionally or alternatively, the control system 18 may include a carbon dioxide module M6 that controllably releases carbon dioxide gas into the ambient air volume AA of the hydroponic pond system 10. Yet additionally or alternatively, the control system 18 may include an external air temperature and external air humidity sensor module M7; and a control system pump module M8. An electrical power source μl optionally provides electrical power to one or more control system elements C1-C3, M1-M8 & S1-S9 through an internal communications and power bus C1 (hereinafter, "bus" C2) or through one or more additional or alternate electrically conductive lines (not shown).

The sensors S1 through S9 and the input modules M1 through M8 are communicatively coupled to the processor C1 via the bus C2. A network interface module C3 communicatively couples the processor C1 via the control system internal communications bus C2 to the internet and/or other suitable electronics communications networks known in the art.

Figure 4B:
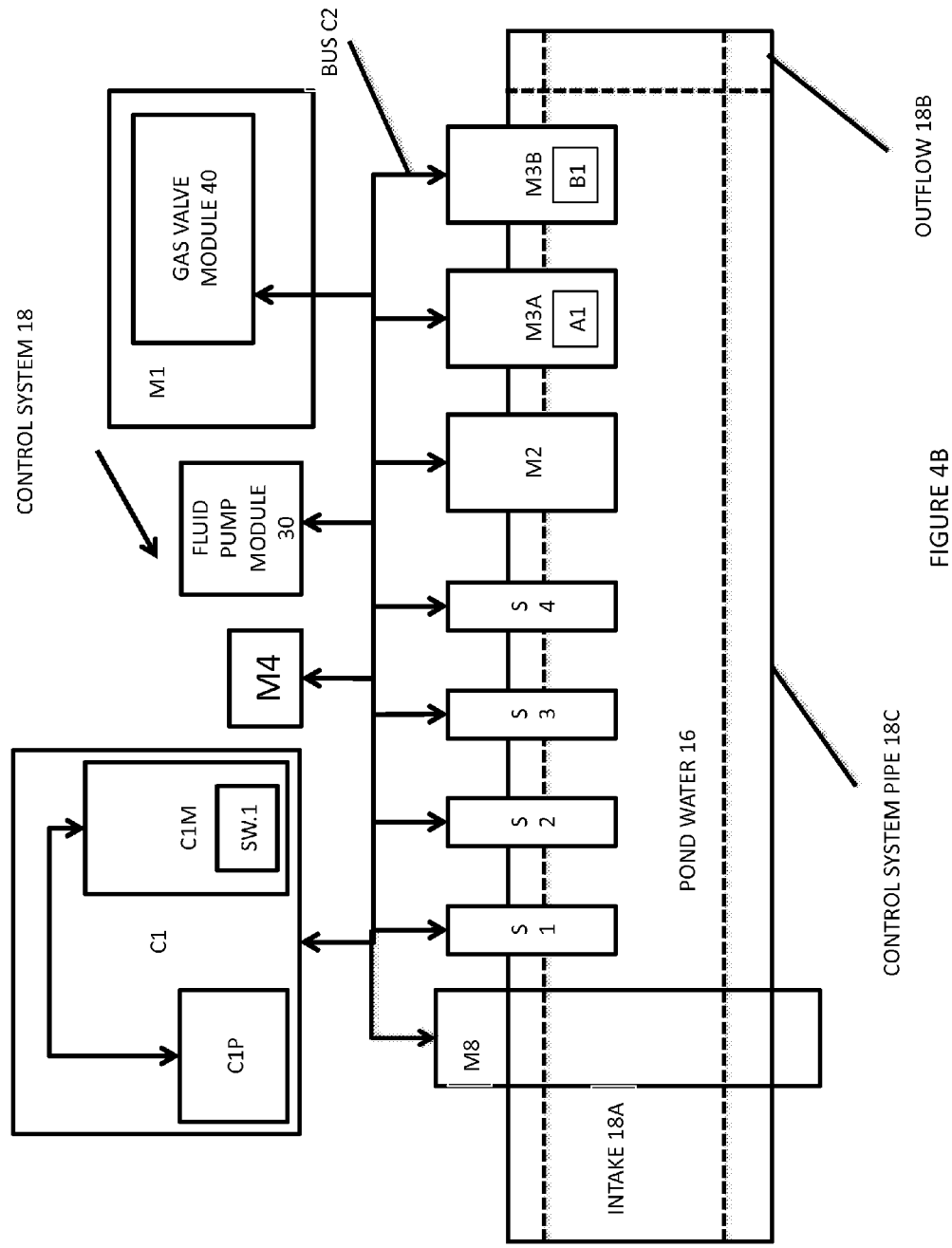
FIG. 4B is a partial schematic of the hydroponic system of FIGS. 2A and 2B, and presents aspects of the control system of FIG. 4A.

FIG. 4B is a schematic diagram of aspects the control system 18 and the hydroponic system 10. The processor C1 is illustrated to include a central processing unit C1 that is bidirectionally coupled with a processor memory C1M, wherein the processor memory C1M includes a system software SW.1. The system software SW.1 includes software encoded instructions that direct the central processing unit C1 to execute or instantiate the aspects of methods disclosed herein. The control system motorized pump module M8 causes pond water 16 to flow through a control system pipe 18C, wherein the pond system pipe comprises the intake pipe 18A and the out take pipe 18B and whereby pond water 16 is circulated through the tank 12 and the control system pipe 18C. A water filter 18D is positioned within the control system pipe 18C to filter the pond water 16 prior to the pond water contacting sensors S1-S4 or modules M2, M3A & M3A within the control system pipe 18C. The water filter 18D may be or comprise an S17A™ water purifier as marketed by Sanitron Industries PTE LTD of Singapore or other suitable water filtration products known in the art.

Selected sensors S1-S4 are inserted into the control system pipe 16C and making contact with the pond water 16 therein. Selected modules M2, M3A & M3B are additionally inserted into the control system pipe 18C whereby the inserted modules 18C may deliver the nutrient composition 8, acidic agents A1 and base materials B1 into the pond water 16.

Figure 4C:
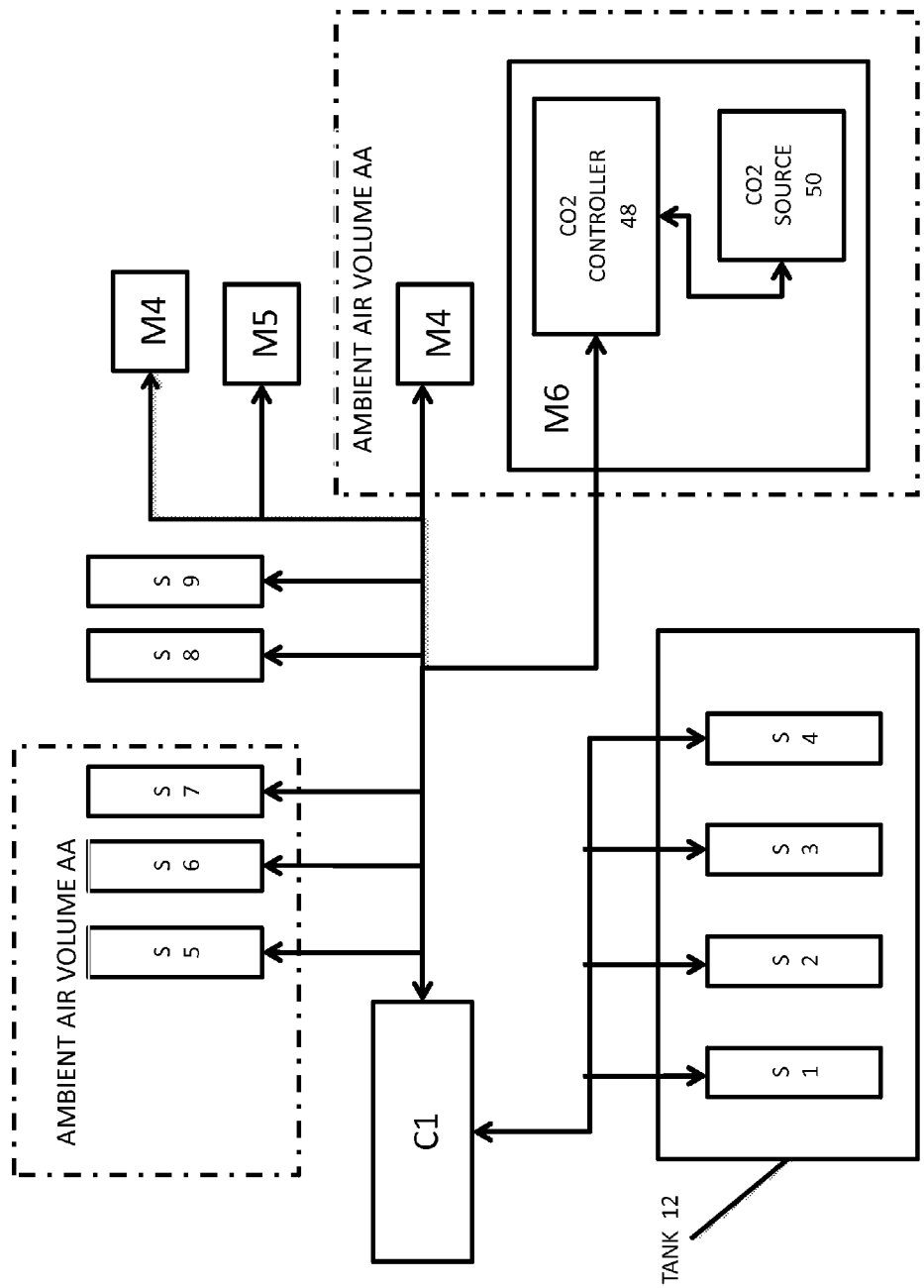
FIG. 4C is a partial schematic of the hydroponic system of FIGS. 2A and 2B, and presents alternative and additional aspects of the control system of FIG. 4A.

FIG. 4C is a schematic diagram of aspects the control system 18 and the hydroponic system 10. Selected sensors S5, S6 & S7 and modules M4 & M6 are shown to be exposed to the ambient air AA proximate to the pond water top surface 16T and other selected sensors S8 & S9 and modules M4 & M5 are shown to be exposed to the environment external to the system 10 and the ambient air AA. In additional, selected sensors S1-S4 are shown to be submerged in the pond water and within the tank 12.

Figure 5:
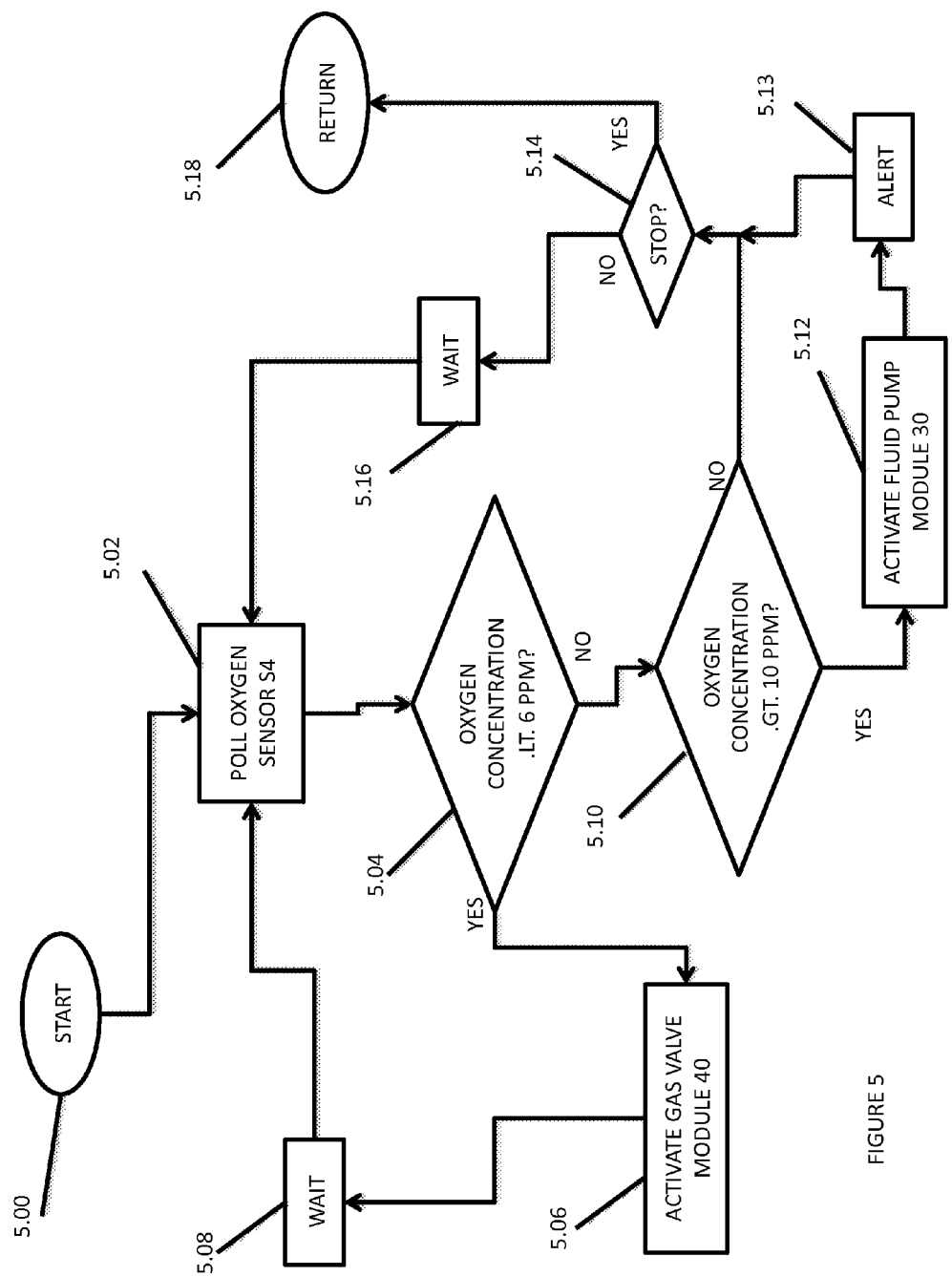
FIG. 5 is a first control loop applied by the control system of FIG. 4A to maintain an oxygen level in the pond water above six parts per million.

Referring now to FIG. 5, FIG. 5 illustrates a first control loop whereby the hydroponic system 10 maintains an oxygen level in the pond water 16 above a selected lower concentration level of six parts per million and below an upper concentration of ten parts per million. It is understood that methods may be applied to support maintenance of an alternate range of oxygen concentration level in the pond water 16.

The processor C1 polls the dissolved oxygen sensor S4 in step 5.02 to generate a measurement of a current oxygen concentration of the pond water 16. The dissolved oxygen sensor S4 may be or comprise an HI 76407/10™ standard dissolved oxygen probe as marketed by Hanna Instruments, Inc., of Woonsocket, R.I., or other suitable dissolved oxygen probes known in the art. The processor C1 determines in step 5.04 whether the oxygen concentration measurement most recently received measurement from the oxygen concentration sensor S4 indicates that the oxygen concentration level of the pond water 16 is currently less than six parts per million. When the processor C1 determines in step 5.04 that the oxygen concentration measurement most recently received measurement from the oxygen concentration sensor S4 indicates that the oxygen concentration level of the pond water 16 is currently less than six parts per million, the control system 18 proceeds on to step 5.06 and to apply the oxygen module M1 to controllably deliver oxygen to the pond water 16 via the main air line 26 and the air line lengths 28 by energizing the gas valve module 40 to deliver compressed gas to the main air line 26. A wait step 5.08 is disposed in between step 5.06 and step 5.02 wherein the processor C1 is available to perform alternate operations.

When the processor C1 determines in step 5.04 that the oxygen concentration measurement most recently received measurement from the oxygen concentration sensor S4 indicates that the oxygen concentration level of the pond water 16 is not currently less than six parts per million, the control system 18 proceeds on to step 5.10 and to determine whether the oxygen concentration of the pond water 16 is currently greater than ten parts per million. When the processor C1 determines in step 5.10 that the oxygen concentration of the pond water 16 is currently greater than ten parts per million, the control system 18 proceeds to step 5.12 and to activate the fluid pump module 30 to pump pond water 16 out of the tank 16 and to simultaneously pump source water 2 into the tank 12. The control system 18 optionally issue an alert of excessive oxygen concentration via the network interface C2 in step 5.13 of the excessive oxygen concentration level detected in step 5.10. Alternatively, when the processor C1 determines in step 5.10 that the oxygen concentration of the pond water 16 is currently not greater than ten parts per million, the control system 18 proceeds from step 5.10 to step 5.14 and thereupon to determine whether the hydroponic system 10 shall (a.) process another iteration of the loop of steps 5.102 through 5.16, or (b.) proceed on to step 5.18 and to perform alternate operations. A wait step 5.16 is disposed in between step 5.14 and step 5.02 wherein the processor C1 is available to perform alternate operations.

Figure 6A:
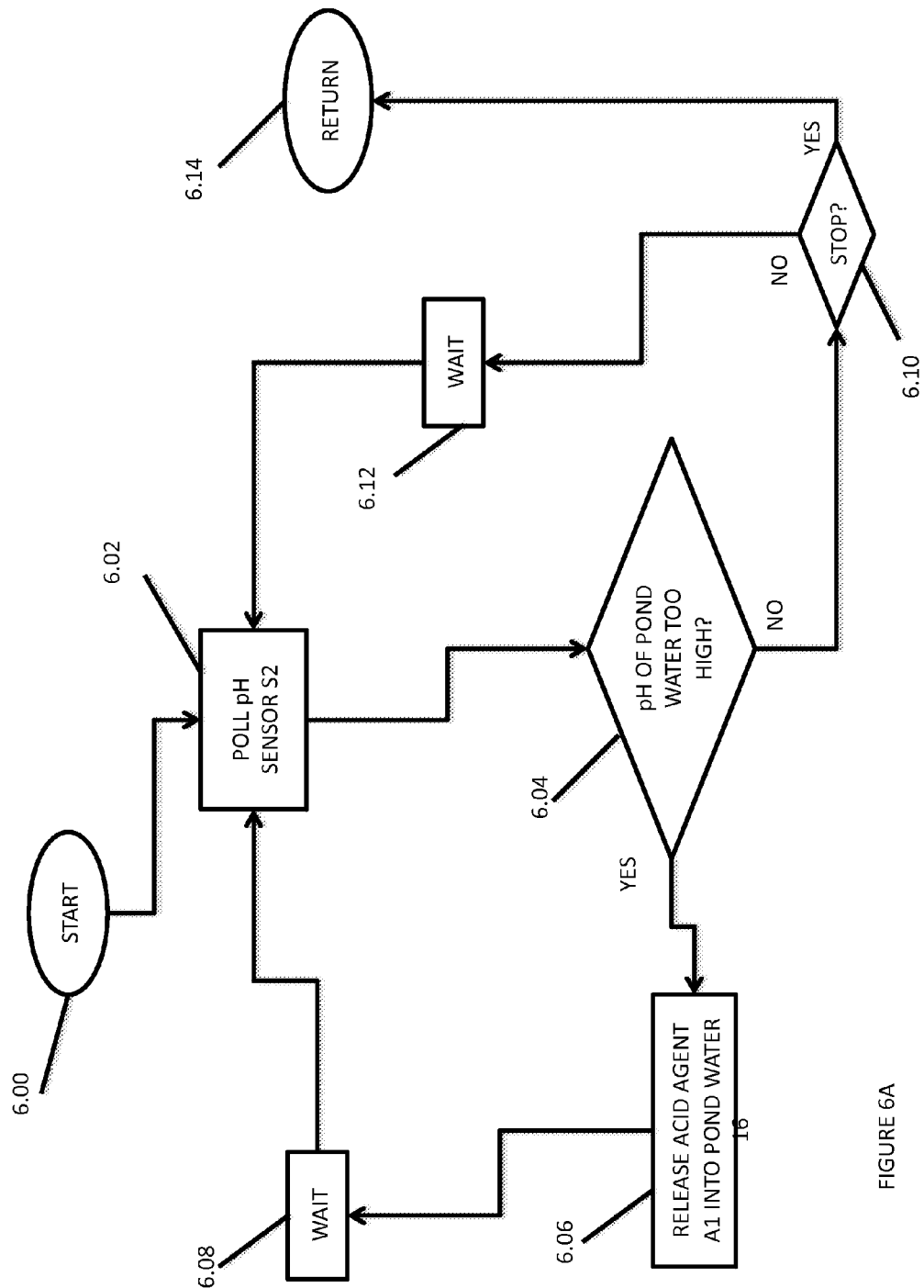
FIG. 6A is a second control loop applied by the control system of FIG. 4A to maintain a pH level in the pond water below a preselected value.

Referring now to FIG. 6A, FIG. 6A illustrates a second control loop whereby the hydroponic system 10 maintains a pH level in the pond water 16 above a preselected level, e.g., a pH of 5. It is understood that methods may be applied to support maintenance of an alternate pH range in the pond water 16.

The processor polls the pH sensor S2 in step 6.02 to generate measurement of a current pH level of the pond water 16. The processor C1 next determines in step 6.04 whether the pH most recently received measurement from the pH sensor S2 indicates that the pH level of the pond water 16 is currently higher than the selected level. When the processor C1 determines in step 6.04 that the pH most recently received measurement from the pH sensor S2 indicates that the pH level of the pond water 16 is currently higher than the selected level, the control system 18 proceeds on to step 6.06 and to apply the acidic agent module M3A to controllably deliver an acidic agent A1 to the pond water 16 and to reduce the pH of the pond water 16. A wait step 6.08 is disposed in between step 6.06 and step 6.02 wherein the processor C1 is available to perform alternate operations.

When the processor C1 determines in step 6.04 that the pH most recently received measurement from the pH sensor S2 indicates that the pH level of the pond water 16 is not currently higher than the selected pH level, the control system 18 proceeds on to step 6.10 and to determine whether the hydroponic system 10 shall (a.) process another iteration of the loop of steps 6.02 through 6.12, or (b.) proceed on to step 6.14 and to perform alternate operations. A wait step 6.12 is disposed in between step 6.10 and step 6.02 wherein the processor C1 is available to perform alternate operations.

Figure 6B:
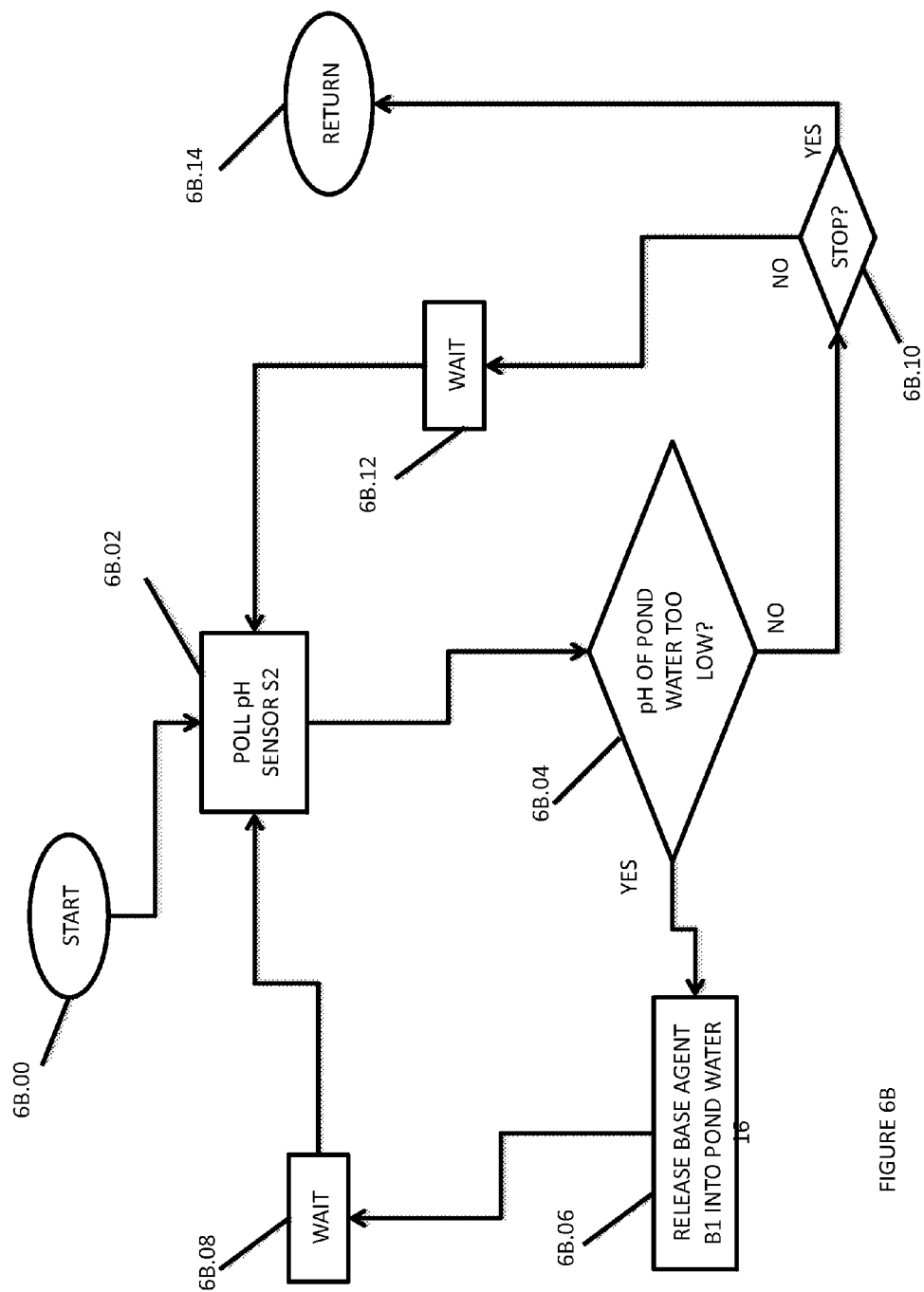
FIG. 6B is a third control loop applied by the control system of FIG. 4A to maintain a pH level in the pond water above a preselected value.

Referring now to FIG. 6B, FIG. 6B illustrates a third control loop whereby the hydroponic system 10 maintains a pH level in the pond water 16 above a lower preselected pH level, e.g., a pH of 4.9. It is understood that methods may be applied to support maintenance of an alternate pH range in the pond water 16B.

The processor polls the pH sensor S2 in step 6B.02 to generate measurement of a current pH of the pond water 16B. The processor C1 then determines in step 6B.04 whether the pH most recently received measurement from the pH sensor S2 indicates that the pH level of the pond water 16 is currently lower than the lower preselected pH level. When the processor C1 determines in step 6B.04 that the pH most recently received measurement from the pH sensor S2 indicates that the pH level of the pond water 16 is currently lower than the lower preselected pH level, the control system 18 proceeds on to step 6B.06 and to apply the base material module M3B to controllably deliver a base material B1 to the pond water 16 to raise the pH of the pond water 16B. A wait step 6B.08 is disposed in between step 6B.06 and step 6B.02 wherein the processor C1 is available to perform alternate operations.

When the processor C1 determines in step 6B.04 that the pH most recently received measurement from the pH sensor S2 indicates that the pH level of the pond water 16 is not currently lower than the lower preselected level, the control system 18 proceeds on to step 6B.10 and to determine whether the hydroponic system 10 shall (a.) process another iteration of the loop of steps 6B.02 through 6B.12, or (b.) proceed on to step 6B.14 and to perform alternate operations. A wait step 6B.12 is disposed in between step 6B.10 and step 6B.02 wherein the processor C1 is available to perform alternate operations.

Referring now to FIG. 7, FIG. 7 illustrates a first electrical conductivity ("EC") control loop whereby the hydroponic system 10 is adapted to attempt to maintain a salinity of the pond water 16 within a predetermined range. It is understood that methods may be applied to support maintenance of an alternate salinity range of the pond water 16.

It is understood that electrical conductivity is a measure of salinity of the pond water, and further that salinity is an indication of a concentration of the formulation 8 in the pond water 16. If the electrical conductivity is too low for a given set point, the control system 18 will add formulation 8 from the nutritional additive dispenser module M2, wherein the formulation 8 may contain any, some or all of a predetermined assortment of any of 23 minerals and nutrients known in the art. A typical range of electrical conductivity measurements of the EC sensor S1 might be from, or include, 1.5 Siemens/meter to 4.0 Siemens/meter. In rare cases it could be outside these parameters. If the electrical conductivity measurement of the EC sensor S1 is too high, than the system 10 adds source water 2 to the tank 12 and/or an alarm and shut down procedure will start for the irrigation system to prevent extreme salty water to be delivered to the plants.

The processor polls the EC sensor S1 in step 7.02 to generate a measurement of a current EC level of the pond water 16. The processor C1 next determines in step 7.04 whether the EC measurement most recently received measurement from the EC sensor S1 indicates that the EC level of the pond water 16 is currently below a lower EC limit. When the processor C1 determines in step 7.04 that the EC measurement most recently received measurement from the EC sensor S1 indicates that the EC level of the pond water 16 is currently less than the lower EC limit, e.g., the control system 18 proceeds on to step 7.06 and to instruct the nutritional additive dispenser module M2 to controllably deliver the nutritional additive dispenser module M2 to the pond water 16. A wait step 7.08 is disposed in between step 7.06 and step 7.02 wherein the processor C1 is available to perform alternate operations.

When the processor C1 determines in step 7.04 that the EC measurement most recently received measurement from the EC sensor S1 indicates that the EC level of the pond water 16 is not currently less than the lower EC limit, the control system 18 proceeds on to step 7.10 and to determine whether the EC of the pond water 16 is currently greater than an upper EC limit. When the processor C1 determines in step 7.10 that the EC of the pond water 16 is currently greater than the upper EC limit, e.g., 4.0 Siemens/meter, the control system 18 proceeds to step 7.12 and to activate the fluid pump module 30 to pump pond water 16 out of the tank 16 and to simultaneously pump source water 2 into the tank 12. The control system 18 optionally issue an alert of excessive salinity via the network interface C2 in step 7.13 of the excessive EC level, e.g., above 4.0 Siemens/meter, detected in step 7.10. Alternatively, when the processor C1 determines in step 7.10 that the EC of the pond water 16 is currently not greater than the upper EC limit, the control system 18 proceeds from step 7.10 to step 7.14 and thereupon to determine whether the hydroponic system 10 shall (a.) process another iteration of the loop of steps 7.102 through 7.16, or (b.) proceed on to step 7.18 and to perform alternate operations. A wait step 7.16 is disposed in between step 7.14 and step 7.02 wherein the processor C1 is available to perform alternate operations.

As noted previously herein, the controller system may optionally include an HI 2500™ mini-controller fertigation system as marketed by Hanna Instruments, Inc., of Woonsocket, R.I., to provide the functions of sensing and controlling the pH, salinity and electrical conduction properties of the pond water 16. Alternatively, the EC sensor S1 may be or comprise a HI 76300 ™ four-ring platinum conductivity probe as marketed by Hanna Instruments, Inc., of Woonsocket, R.I., or other suitable electrical conductivity sensor known in the art. The nutritional additive dispenser module M2 may be or comprise BL 7917 ORP™ controller and chemical dosing pump as marketed by Hanna Instruments, Inc., of Woonsocket, R.I., or other suitable plant nutrient dosing device known in the art.

Figure 8:
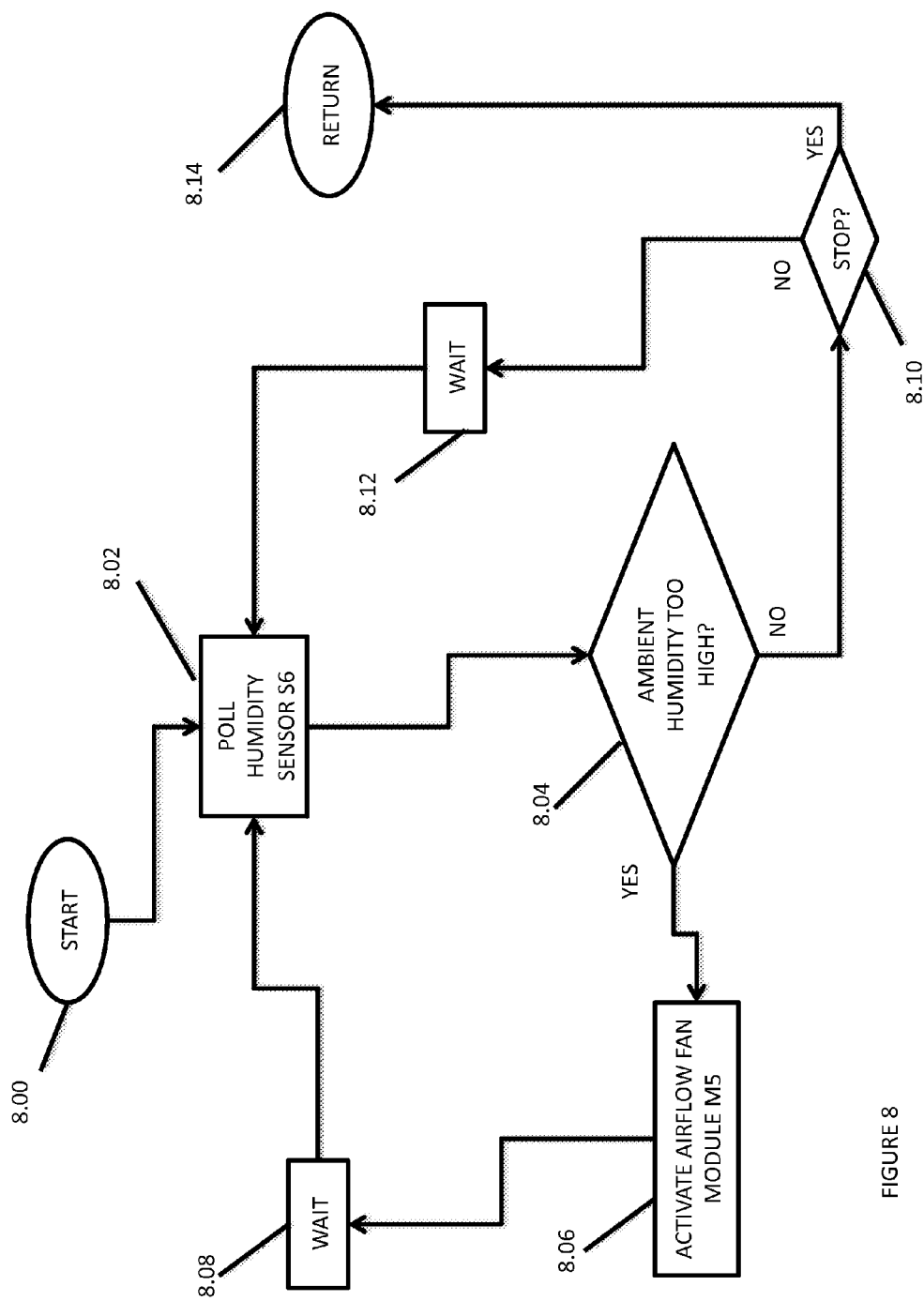
FIG. 8 is a fifth control loop applied by the control system of FIG. 4A to maintain the humidity of the ambient air of the hydroponic pond system below a preselected value.

Referring now to FIG. 8, FIG. 8 includes a fifth control loop applied by the control system 18 of FIG. 4 to maintain the humidity of the ambient air volume AA of the hydroponic pond system 10 below a preselected humidity value. The control system 18 monitors both a data output of the air humidity sensor S6 and the external air humidity sensor S8 to determine when and how to direct one or more motorized fan modules M5 to transfer air to or from the ambient air volume AA of the hydroponic pond system 10 in order to maintain air humidity of the ambient air volume AA proximate to the pond water 16 below the preselected humidity value.

The processor C1 polls the humidity sensor S6 in step 8.02 to generate a measurement of a current humidity measurement of the ambient air volume AA proximate to the pond water 16. The processor C1 the determines in step 8.04 whether the air humidity value of the most recently received measurement from the humidity sensor S6 indicates that the level of air humidity of the ambient air volume AA proximate to the pond water 16 is higher the preselected humidity value. When the processor C1 determines in step 8.04 that the humidity most recently received measurement from the humidity sensor S6 indicates that the air humidity level of the air volume AA proximate to the pond water 16 is currently higher than the preselected humidity value, the control system 18 proceeds on to step 8.06 and to activate one or more motorized fan modules M5. A wait step 8.08 is disposed in between step 8.06 and step 8.02 wherein the processor C1 is available to perform alternate operations.

When the processor C1 determines in step 8.04 that the humidity most recently received measurement from the humidity sensor S6 indicates that the humidity level of ambient air AA proximate to the pond water 16 is not currently higher than the preselected humidity value, the control system 18 proceeds on to step 8.10 and to determine whether the hydroponic system 10 shall (a.) process another iteration of the loop of steps 8.02 through 8.12, or (b.) proceed on to step 8.14 and to perform alternate operations. A wait step 8.12 is disposed in between step 8.10 and step 8.02 wherein the processor C1 is available to perform alternate operations.

Figure 9:
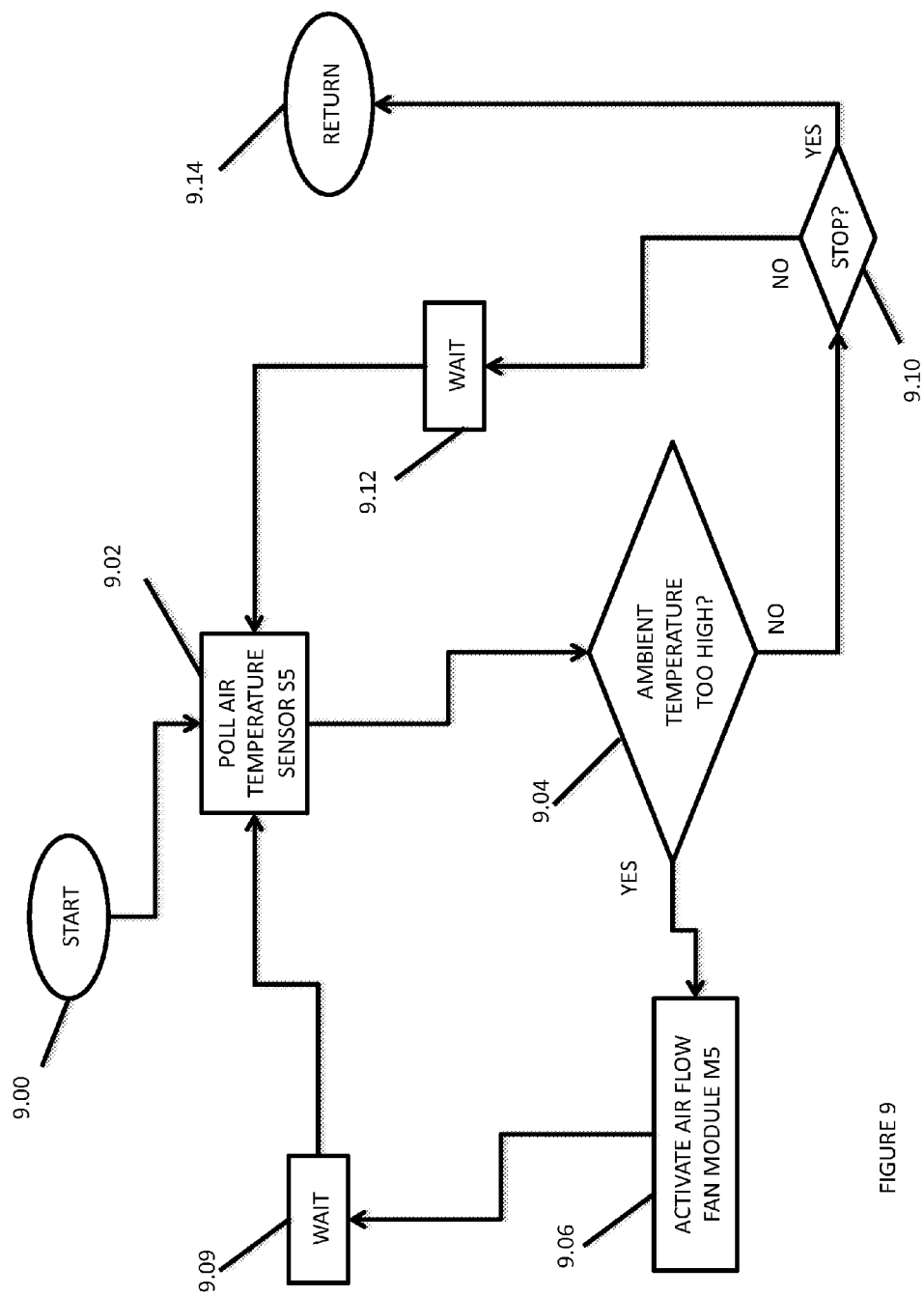
FIG. 9 is a sixth control loop applied by the control system of FIG. 4A to maintain the temperature of the ambient air of the hydroponic pond system below a preselected value.

Referring now to FIG. 9, FIG. 9 is a sixth control loop applied by the control system 18 to maintain the temperature of the ambient air volume AA of the hydroponic pond system 10 below a preselected temperature value. The control system 18 monitors both a data output of the air temperature sensor S5 and a data output of the external air temperature S9 to determine when and how to direct one or more motorized fan modules M5 to transfer air to or from the ambient air volume AA of the hydroponic pond system 10 in order to maintain air temperature of the air volume AA proximate to the pond water 16 below the preselected temperature value.

The processor C1 polls the temperature sensor S5 in step 9.02 to generate a measurement of a current temperature measurement of the ambient air volume AA proximate to the pond water 16. The processor C1 then determines in step 9.04 whether the air temperature most recently received measurement from the temperature sensor S5 indicates that the level of air temperature of the air volume AA proximate to the pond water 16 is higher the preselected temperature value. When the processor C1 determines in step 9.04 that the temperature most recently received measurement from the temperature sensor S5 indicates that the air temperature level of the air volume AA proximate to the pond water 16 is currently higher than the preselected temperature value, the control system 18 proceeds on to step 9.06 and to activate one or more motorized fan modules M5. A wait step 9.08 is disposed in between step 9.06 and step 9.02 wherein the processor C1 is available to perform alternate operations.

When the processor C1 determines in step 9.04 that the temperature most recently received measurement from the temperature sensor S5 indicates that the temperature level of air proximate to the pond water 16 is not currently higher than the preselected temperature value, the control system 18 proceeds on to step 9.10 and to determine whether the hydroponic system 10 shall (a.) process another iteration of the loop of steps 9.02 through 9.12, or (b.) proceed on to step 9.14 and to perform alternate operations. A wait step 9.12 is disposed in between step 9.10 and step 9.02 wherein the processor C1 is available to perform alternate operations.

Figure 10:
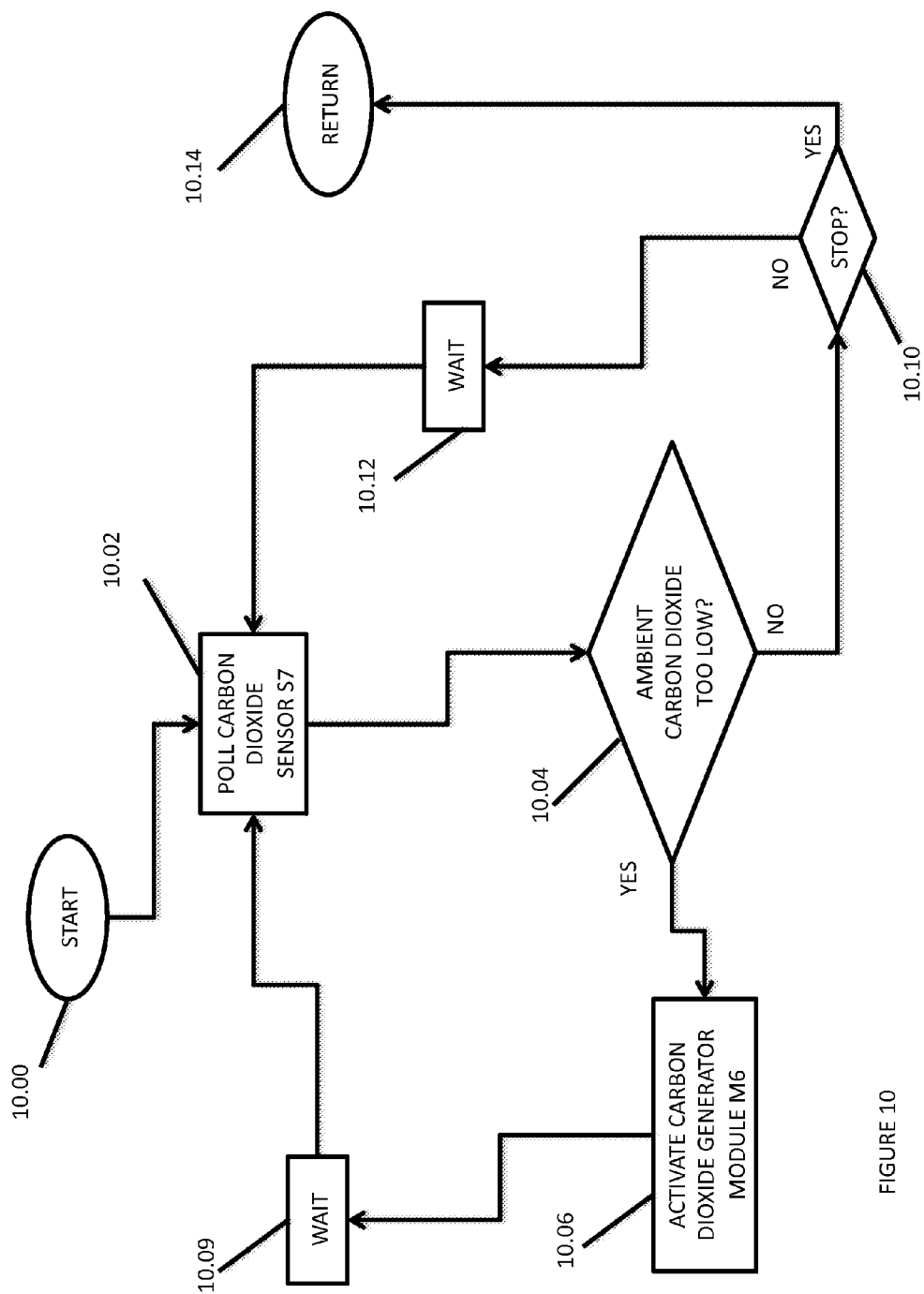
FIG. 10 is a seventh control loop applied by the control system of FIG. 4A to maintain the carbon dioxide of the ambient air of the hydroponic pond system above a preselected value.

Referring now to FIG. 10, FIG. 10 is a seventh control loop applied by the control system 18 to maintain a carbon dioxide concentration level of the ambient air volume AA of the hydroponic pond system 10 above a preselected carbon dioxide concentration value. The control system 18 monitors a data output of the carbon dioxide concentration sensor S7 to determine whether the carbon dioxide concentration of the air volume AA proximate to the pond water 16 is above a preselected carbon dioxide level.

The processor C1 polls the carbon dioxide concentration sensor S7 in step 10.02 to generate a measurement of a current temperature measurement of the ambient air volume AA environment of the pond water 16. The processor C1 the determines in step 10.04 whether the air temperature most recently received measurement from the carbon dioxide concentration sensor S7 indicates that the carbon dioxide concentration of the air volume AA proximate to the pond water 16 is higher than the preselected carbon dioxide concentration level. When the processor C1 determines in step 10.04 that the carbon dioxide concentration measurement of the most recently received measurement from the carbon dioxide concentration sensor S7 indicates that the carbon dioxide concentration level of the air proximate to the pond water 16 is currently higher than the preselected carbon dioxide concentration level, the control system 18 proceeds on to step 10.06 and to activate the carbon dioxide 48 of the controller carbon dioxide module M6 to release gaseous carbon dioxide 50 to the air volume AA proximate to the pond water 16. A wait step 10.08 is disposed in between step 10.06 and step 10.02 wherein the processor C1 is available to perform alternate operations.

When the processor C1 determines in step 10.04 that the carbon dioxide concentration measurement of the most recently received measurement from the carbon dioxide concentration sensor S7 indicates that the temperature level of air proximate to the pond water 16 is not currently lower than the preselected carbon dioxide concentration value, the control system 18 proceeds on to step 10.10 and to determine whether the hydroponic system 10 shall (a.) process another iteration of the loop of steps 10.02 through 10.12, or (b.) proceed on to step 10.14 and to perform alternate operations. A wait step 10.12 is disposed in between step 10.10 and step 10.02 wherein the processor C1 is available to perform alternate operations.

Figure 11:
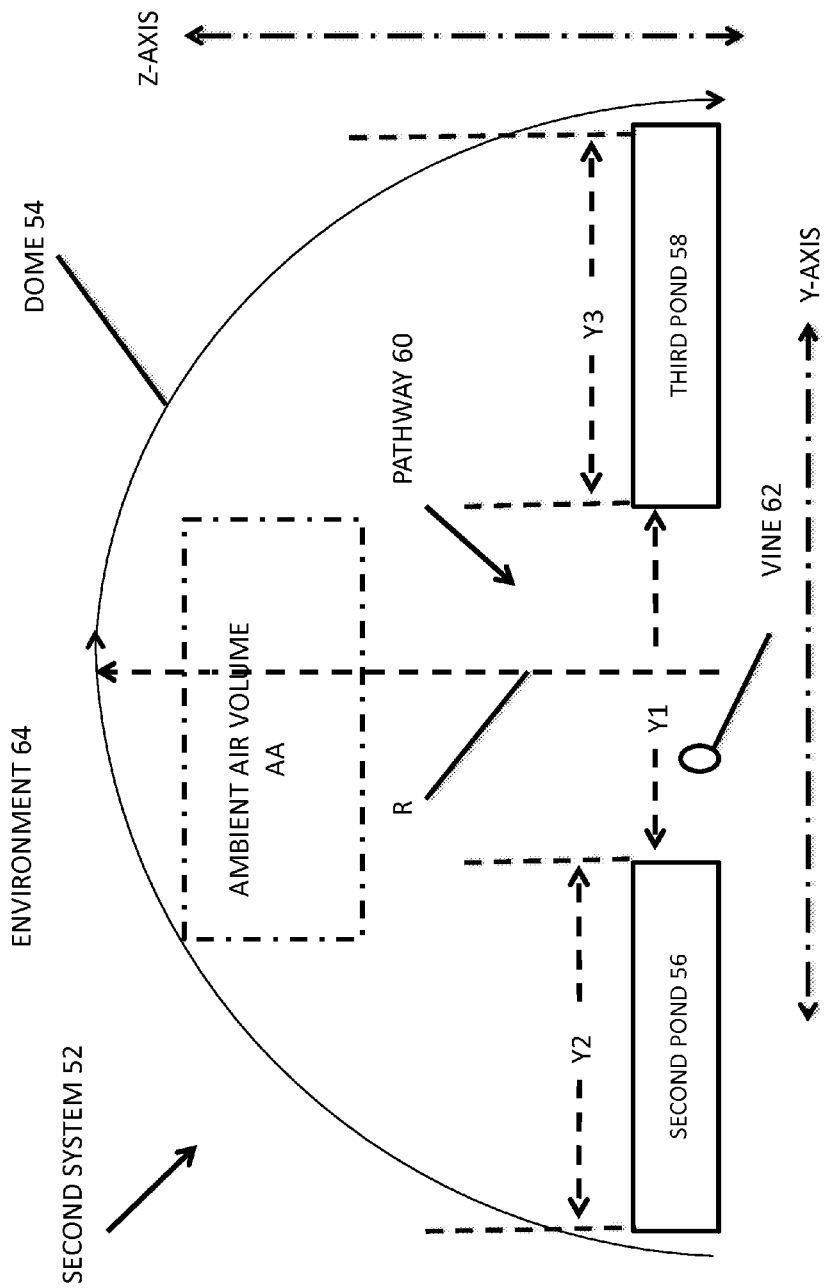
FIG. 11 is a side view of a second system comprising a hemispheric dome and two hydroponic tanks.

FIG. 11 is a cut away side view of a second embodiment of the present disclosure 52 (hereinafter, "second system" 52, a hemispheric dome 54 having a radius R substantially encloses two hydroponic ponds 56 & 58 and the ambient air volume AA. The dome may be or comprise a GREENHOUSE DOME™ as marketed by Pacific Domes, Inc. of Ashland Oreg. or other suitable sheltering system known in the art.

The two hydroponic ponds 56 & 58 are shaped and positioned to allow an access pathway 60. The pathway 60 has a width dimension that is in the range of from two feet to one third of the radius R. Each hydroponic pond 56 & 58 has a maximum width dimension Y2 & Y3 of one third of the radius R and less than 8 feet to enable access to plants 4.

It is understood that the pathway 60 may at least partly be populated with additional plants, such as vine plants 62. One or more vine plants 62, or other plants, located within the pathway 60 may be watered by means of drip irrigation delivery of source water 2 and/or pond water 16.

Figure 12:
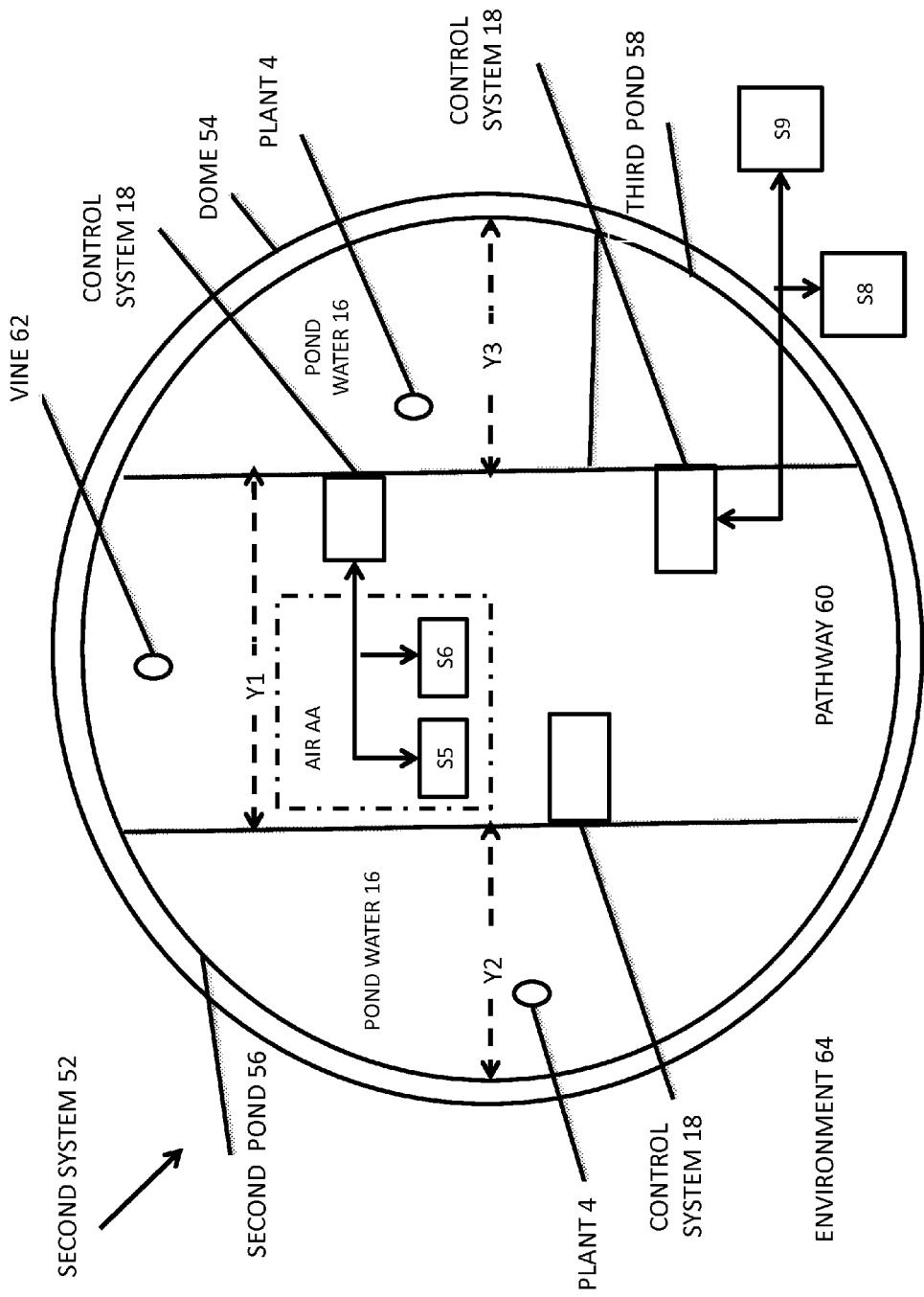
FIG. 12 is a top view of a second system of FIG. 11.

FIG. 12 is a cut-away top view of the second system 52. It is understood that either the second pond 56 or the third pond 58 may be divided into two or more compartments 56A & 56B, wherein each compartment 58A & 58B may have isolated pond water 16 and dedicated or shared control systems 18. It is understood that selected sensors S8 & S9 may be positioned outside of the dome 54. It is further understood that still other sensors S5 & S6 may be positioned within the ambient air volume AA enclosed within the dome 54.

Figure 13:
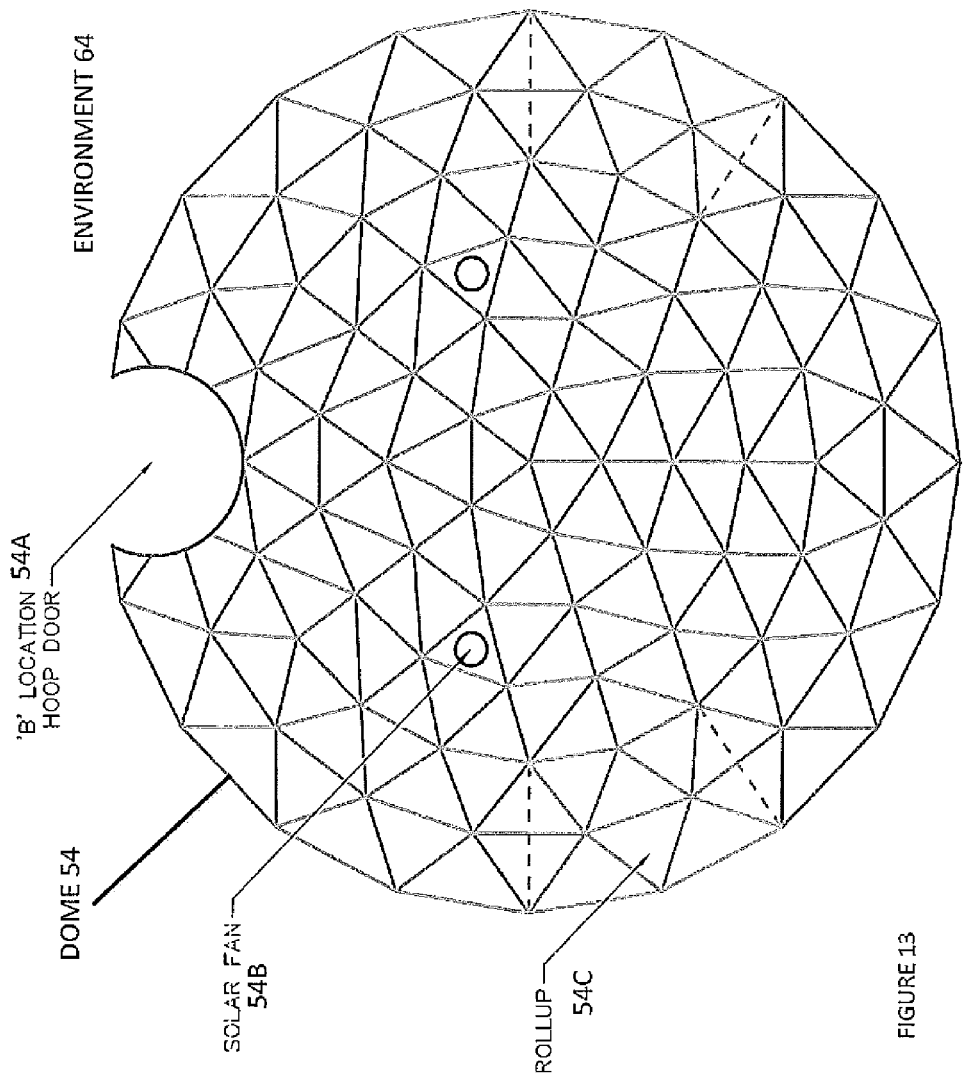
FIG. 13 is an isolated and detailed top view of aspects of the second system and hemispheric dome FIGS. 11 and 12.

FIG. 13 is an isolated top view of the dome 54 of the second system 52. A hoop door aperture 54A enables worker access to the pathway 60. One or more solar fans 54B are comprised with fan modules M5 and convert solar energy into electrical energy to at least partially power the fan modules M5. One or more fabric roll-up sheets 54C enable varying sizing of apertures that enable air exchange between the ambient air volume AA and the environment external to the dome 54.

Figure 14:
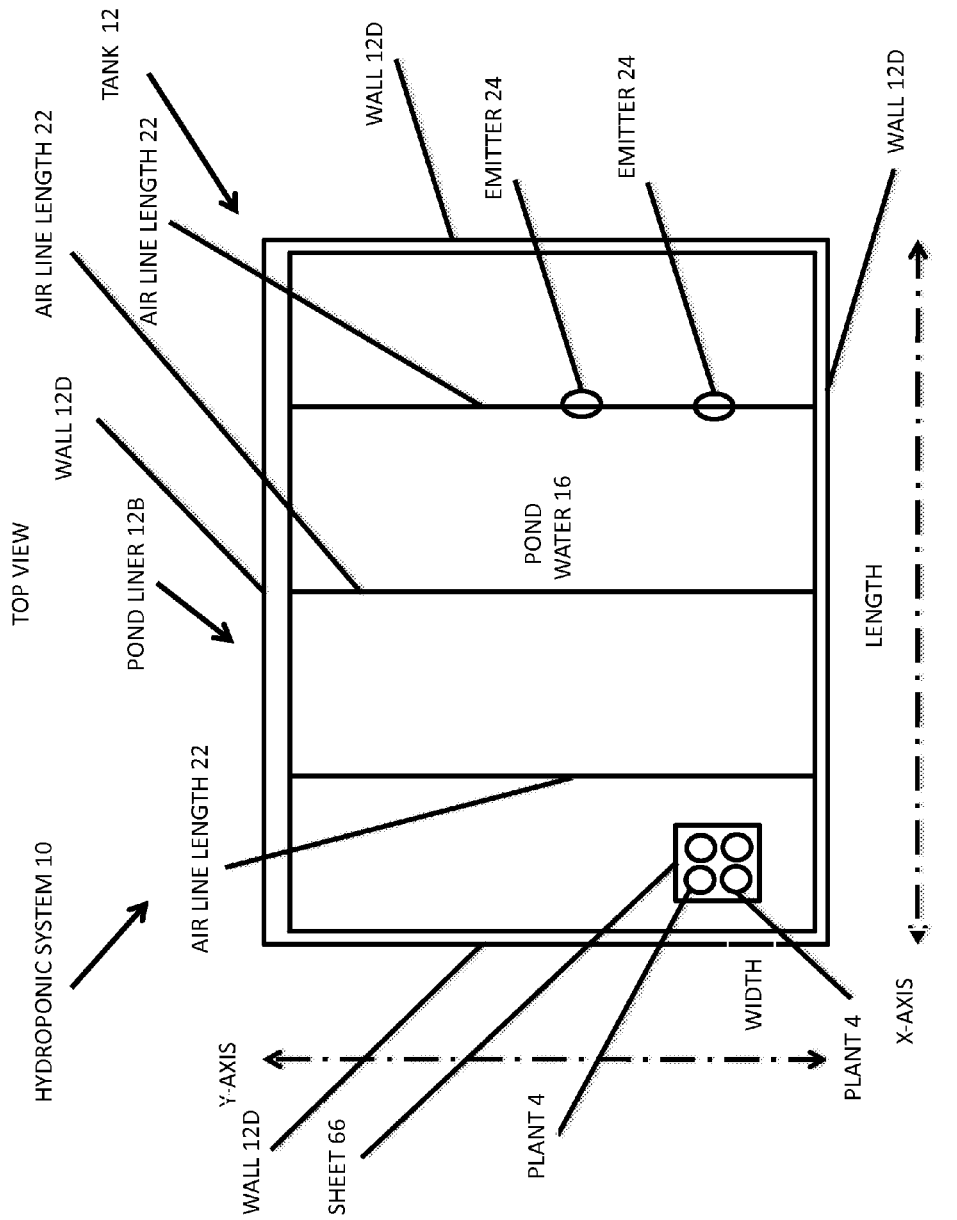
FIG. 14 is a detailed top view of selected optional aspects of the air line lengths and gas emitters of the hydroponic pond system of FIGS. 2A, 2B and 3.

FIG. 14 is a detailed top view of selected optional aspects of the system 10. Two or a plurality of air emitters 24 are coupled with each air line length 22 and are spaced along its coupled air line length 22 at displacements in the range of from 12 inches to 36 inches away from any nearest other emitter 24. In some embodiments, each emitter 24 is positioned in the range of from 12 inches to 36 inches from both any liner side wall 12 D and any other emitter 24.

A buoyant sheet 66 supports a plurality of plants 4, wherein a root structure 68 of each plant 4 may extend through the buoyant sheet 66 and toward the liner bottom 12C.

Figure 15:
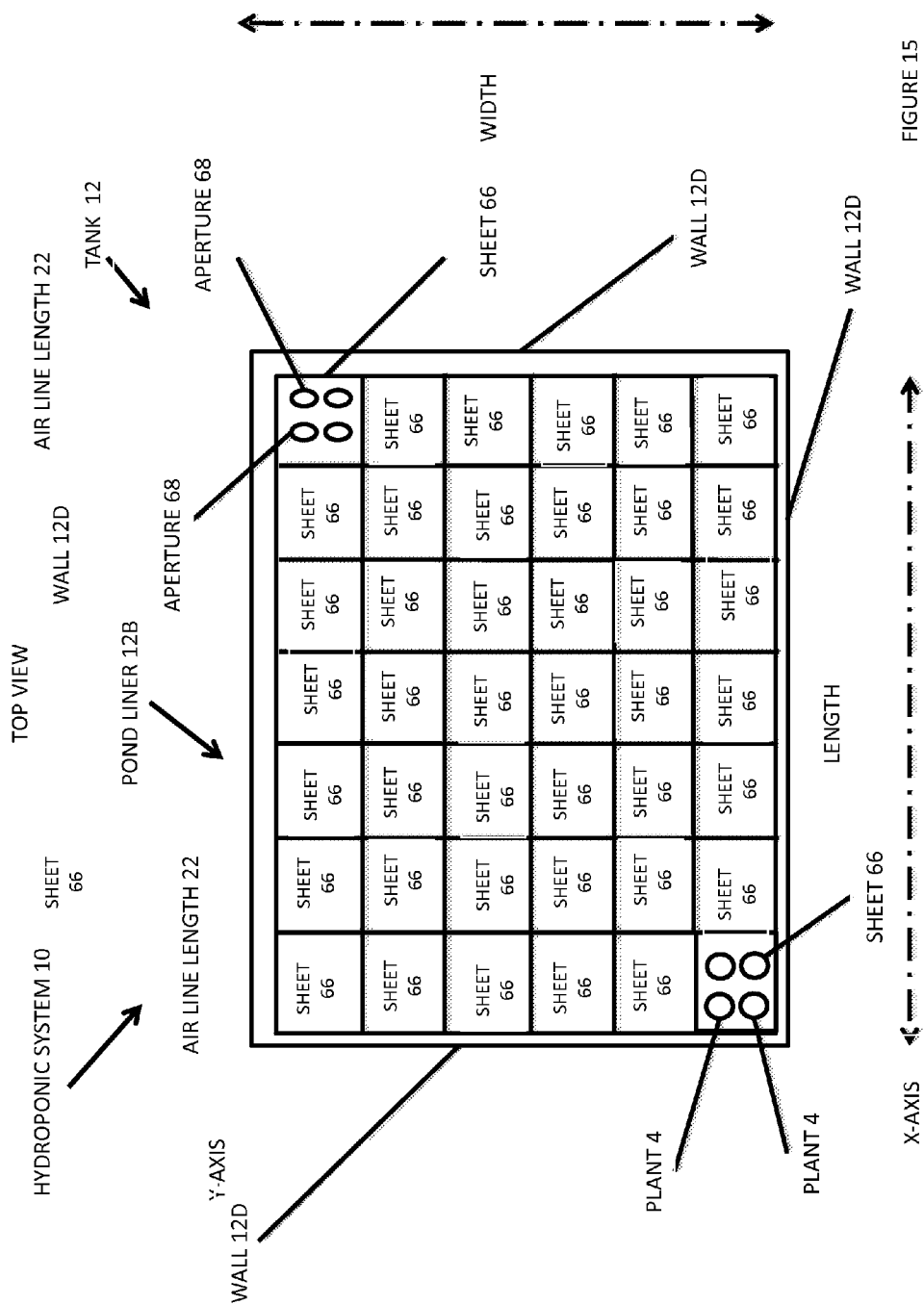
FIG. 15 is a detailed top view of yet other selected optional aspects of the system of floating sheets of material that support the plants of FIGS. 2A, 2B, 3, and 14.

FIG. 15 is a detailed top view of yet other selected optional aspects of the system 10, wherein a plurality of buoyant sheets 66 float upon the pond water 16 proximate to the pond water top surface 16T. Each sheet 66 includes one or more apertures 68 that enable each plant 4 to pass through the sheet 66 supporting the instant plant 4 and further enable the root structure 68 of each buoyantly supported plant 4 to from the top surface 16T and toward the liner bottom 12C, as shown in FIG. 3. One or more sheets 66 are made of, or comprise, buoyant material, such as polystyrene, or other suitable buoyant materials known in the art, and may be shaped in various dimensions, such as between one and two inches thick along the Z-axis and having a length and width of approximately two feet by four feet.

The sheets 66 in combination generally extend over more than 90% of the top pond surface 16T. In some embodiments, the sheets 66 in combination generally extend over more than 99% of the top pond surface 16T, in order to lessen encouragement of growth of algae or any other undesired organism in the pond water 16. The sheets 66 may be removed from contact with the pond top surface 16T either individually or in subsets of sheets 66, whereby the time of exposure and exposed surface area of the top pond surface are reduced or minimized in order to reduce or minimize the encouragement of algae growth or other undesired organisms in the pond water 16.

It will be understood by skilled persons that many changes may be made to the details of the above-described embodiments without departing from the underlying principles of the invention. The scope of the present invention should, therefore, be determined only by the following claims.

I claim:

1. A hydroponic system having a control program to monitor a state of a hydroponic grow environment and control multiple input modules so as to facilitate cultivation of plants, the system comprising:

a tank having a depth in a range from about 24 inches to about 36 inches, the tank being configured to hold a water volume that provides a water depth greater than 24 inches;

a greenhouse encompassing the tank, the greenhouse adapted to impede ambient airflow to and from the tank;

an oxygen sensor adapted to measure an oxygen concentration of the water volume; an oxygen dispensing tube disposed within the water volume;

an oxygen source coupled with the oxygen dispensing tube and adapted to controllably deliver oxygen to the oxygen dispensing tube;

a pH sensor adapted to measure a pH level of the water volume;

an acid delivery module adapted to controllably release an acidic agent into the water volume;

a salinity sensor adapted to measure a salinity of the water volume;

a nutritional additive delivery module adapted to controllably release a nutritional additive into the water volume; and a controller operably coupled to the oxygen sensor, the oxygen source, the pH sensor, the acid delivery module, the salinity sensor, and the nutritional additive delivery module, wherein the controller is responsive to the control program to:

direct the oxygen source to deliver oxygen to the oxygen dispensing tube in response to receiving the measured oxygen concentration from the oxygen sensor and determining that the measured oxygen concentration is below a programmed oxygen concentration amount;

direct the acid delivery module to release the acidic agent into the water volume in response to receiving the measured pH level from the pH sensor and determining that the measured pH level is above a programmed pH level; and direct the nutritional additive delivery module to release the nutritional additive into the water volume in response to receiving the measured salinity from the salinity sensor and determining that the measured salinity is below a programmed salinity amount.

2. The hydroponic system of claim 1, wherein at least a portion of the oxygen dispensing tube releases oxygen within one inch of a bottom of the tank.

3. The hydroponic system of claim 1, wherein at least a portion of the oxygen dispensing tube releases oxygen within ten inches of a top surface of the water volume.

4. The hydroponic system of claim 1, wherein the controller is adapted to direct the oxygen source to release oxygen into the water volume to maintain the oxygen concentration of the water volume within a range of approximately six parts per million to ten parts per million.

5. The system of claim 1, wherein the acidic agent comprises sulphuric acid.

6. The system of claim 1, wherein the acidic agent comprises phosphoric acid.

7. The hydroponic system of claim 1, further comprising:

a carbon dioxide sensor adapted to measure a concentration of carbon dioxide of a zone surrounding the water volume, the carbon dioxide sensor coupled with the controller; and a carbon dioxide gas delivery module, the carbon dioxide gas delivery module coupled with the controller and adapted to release gaseous carbon dioxide into the zone as directed by the controller.

* * * * *